Nov. 17, 1964

A. G. RUSSELL ETAL 3,157,310

MATERIALS HANDLING MECHANISM FOR UNSCRAMBLING
AND SORTING OF TUBULAR ARTICLES

Original Filed May 7, 1956

INVENTORS
ARTHUR G. RUSSELL
FRANK A. CLARY, JR.
BY
ATTORNEYS

INVENTORS
ARTHUR G. RUSSELL
FRANK A. CLARY, JR.

BY

ATTORNEYS

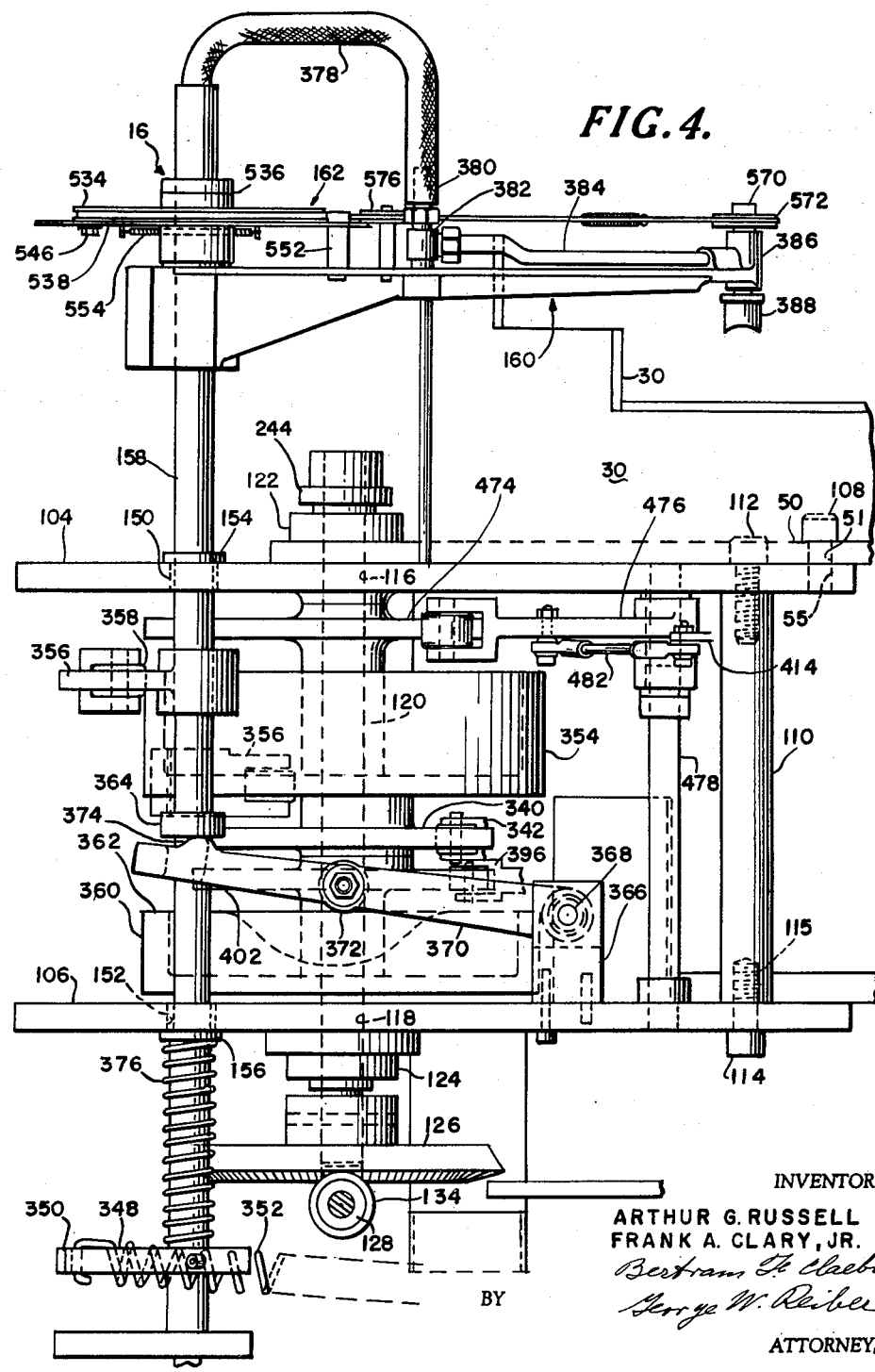

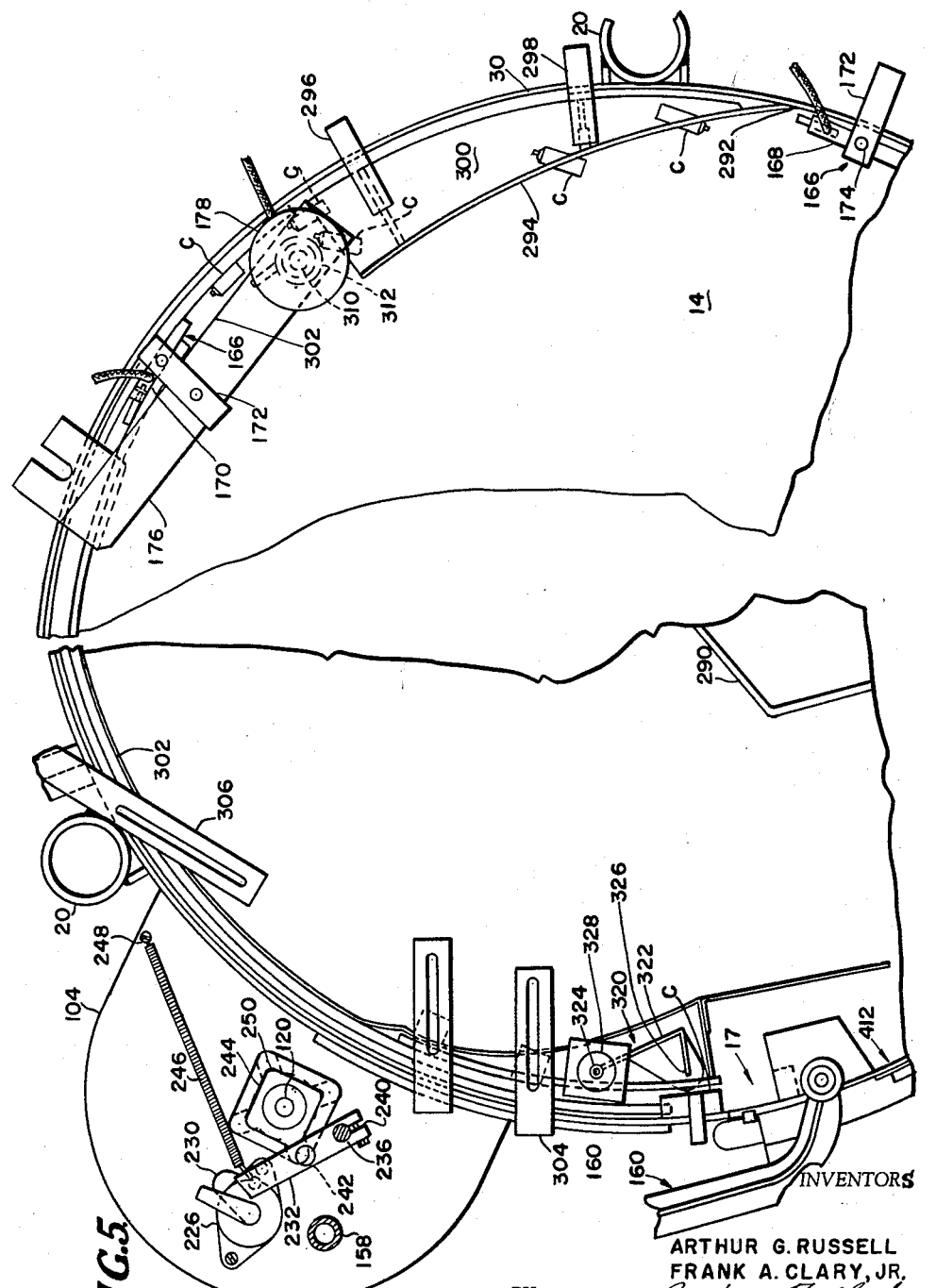

Nov. 17, 1964  A. G. RUSSELL ETAL  3,157,310
MATERIALS HANDLING MECHANISM FOR UNSCRAMBLING
AND SORTING OF TUBULAR ARTICLES
Original Filed May 7, 1956  13 Sheets-Sheet 6
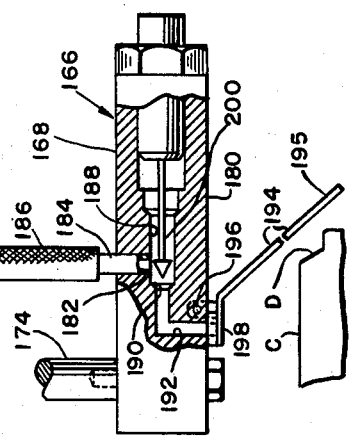
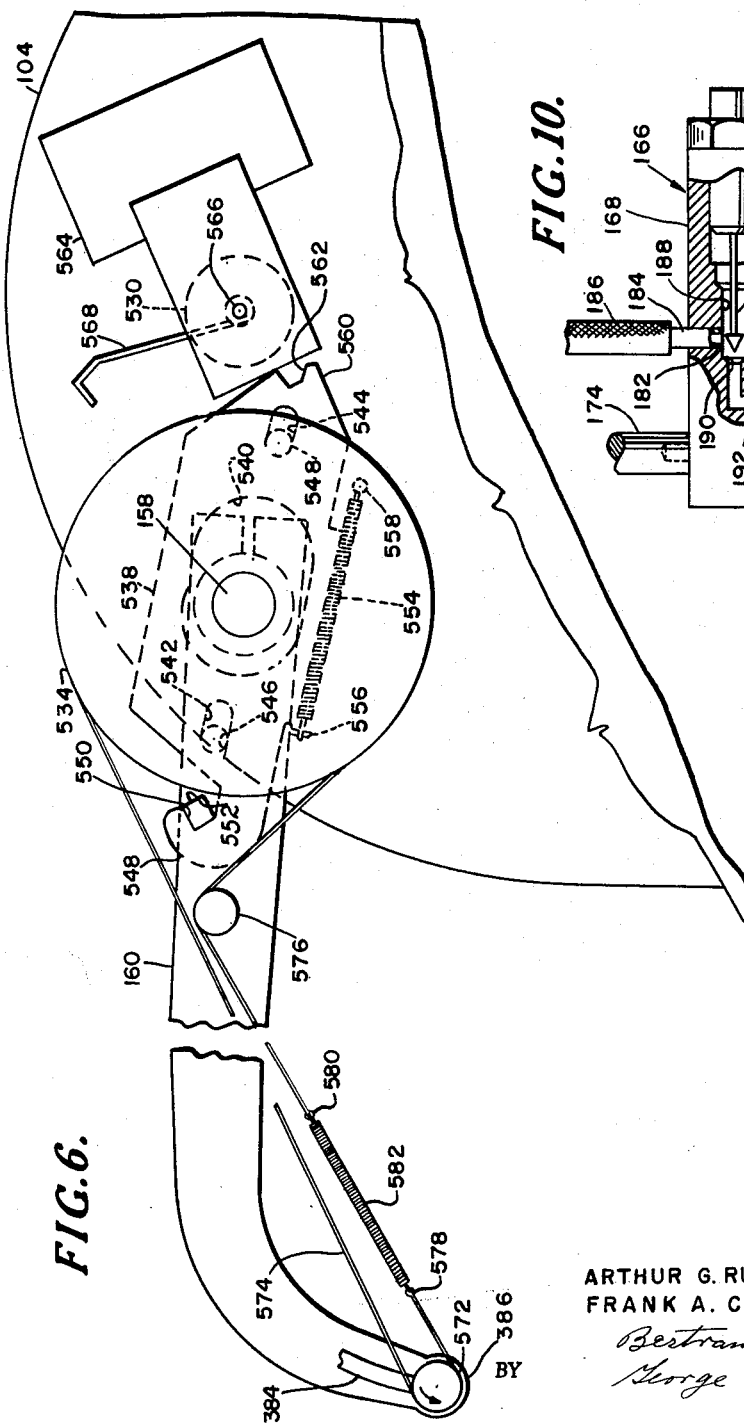
INVENTORS
ARTHUR G. RUSSELL
FRANK A. CLARY, JR.
BY Bertram F. Claeboe
George W. Reiber
ATTORNEYS

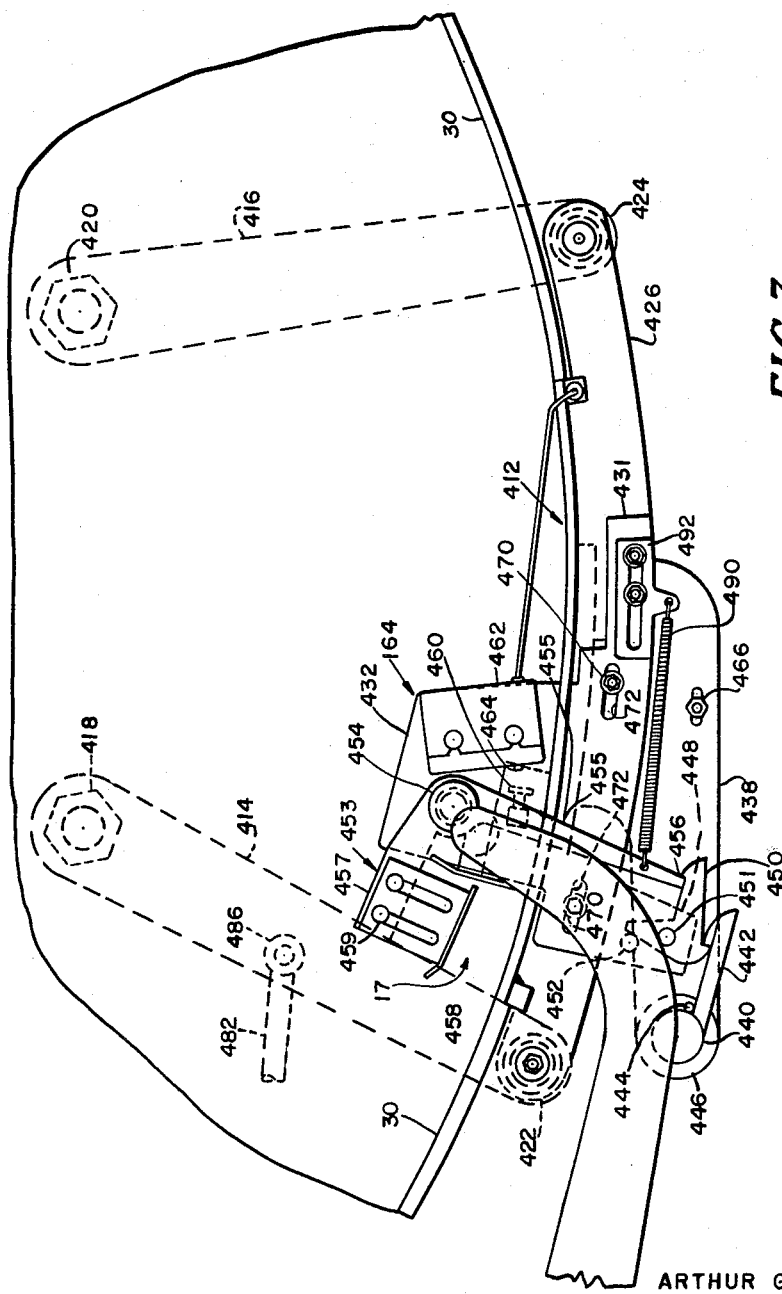

Nov. 17, 1964  A. G. RUSSELL ETAL  3,157,310
MATERIALS HANDLING MECHANISM FOR UNSCRAMBLING
AND SORTING OF TUBULAR ARTICLES
Original Filed May 7, 1956  13 Sheets-Sheet 11

INVENTORS
ARTHUR G. RUSSELL
FRANK A. CLARY, JR.

ATTORNEYS

INVENTORS
ARTHUR G. RUSSELL
FRANK A. CLARY, JR.

3,157,310
MATERIALS HANDLING MECHANISM FOR UNSCRAMBLING AND SORTING OF TUBULAR ARTICLES
Arthur G. Russell and Frank A. Clary, Jr., Bristol, Conn., assignors, by mesne assignments, to American Can Company, New York, N.Y., a corporation of New Jersey
Original application May 7, 1956, Ser. No. 583,072, now Patent No. 3,033,416, dated May 8, 1962. Divided and this application May 25, 1961, Ser. No. 120,841
5 Claims. (Cl. 221—10)

The present invention relates to an apparatus for unscrambling and sorting articles and, more particularly, to an apparatus for unscrambling tubular articles in bulk and transferring the articles onto a conveyor in a particular order.

In the manufacture of containers made from a flexible material, synthetic resins such as polyethylene or the like, the tubular container body is usually molded with one of its ends closed forming one end closure, and the other end open. The open end of the container body is subsequently closed by separate end closures after the container has been filled. When the container body or tubular article is first molded and has an open end, the portion of the tubular article adjacent the open end is very flexible, whereas the portion of the article adjacent the closed end is substantially rigid as compared to the open end. The closed end of the tubular body gives the body adjacent the end rigidity and prevents lateral flexing even though the body itself is made of a flexible material. After the tubular articles heretofore described are formed, and prior to filling, they are usually labeled by printing on the surface of the container body or the like. The usual practice is to automatically feed the container bodies to a printing machine which rapidly performs its intended operation. Consequently, the articles, after being made, must be transferred in a particular order to the labeling apparatus and to the container filling apparatus. The articles are stored in bulk and must be unscrambled and placed in end-to-end relationship in a particular order so that they may be rapidly conveyed to apparatus performing the above mentioned functions.

An object of the present invention is to provide an apparatus which will unscramble tubular articles from a bulk supply of articles and transfer the articles in end-to-end relationship.

Another object of the present invention is to provide an apparatus for unscrambling tubular articles, and placing the articles in end-to-end relationship, the apparatus also orienting the articles so that the ends of the articles are positioned in a particular direction.

Still another object of the present invention is to provide an apparatus wherein articles from a bulk supply are fed to the transferring and unscrambling mechanism automatically upon demand.

A still further object of this invention is to provide an apparatus with means for aliging articles in end-to-end position, the articles being indiscriminately fed to the aligning means from a bulk supply of articles.

Still another object of the present invention is to provide an apparatus which includes a rotating table or conveyor onto which the articles in bulk are fed and a straight line conveyor onto which articles are transferred from the rotating table, the articles being oriented to a particular position while being transferred.

A further object of this invention is to provide a sensing mechanism associated with a bulk supply, the sensing mechanism operable to supply articles from the bulk supply to a rotating table upon demand by the rotating table for more articles.

A still further object of the present invention is to provide means for positioning articles in end-to-end relationship on a rotating table from a bulk supply of articles on the table, and means to prevent the jamming of articles when the articles enter the positioning means.

Another object of the present invention is to provide an article sensing device associated with an article transferring mechanism for transferring articles between one conveyor and another conveyor, the article sensing device operating orienting means to orient the articles as they are being transferred so that they are discharged onto the second conveyor in a particular position.

Still another object of the present invention is to provide a mechanism which will accurately and quickly unscramble and orient or sort articles from a bulk supply of articles.

A further object of this invention is to provide a sensing mechanism for use with an orientation mechanism, the sensing mechanism utilizing the flexibility of a portion of the articles to sense its position and convey this signal to the orientation mechanism.

These and other objects of the present invention will appear more fully in the following specification, claims, and drawings in which:

FIGURE 4 is a side elevational view of the transfer mechanism taken on the line 3—3 of FIGURE 2 and showing the pick-up arm and the operating cams;

FIGURE 5 is a view taken on the line 4—4 of FIGURE 1 and disclosing the rotating table, unscrambling mechanism, and transfer mechanism, portions of the table being broken away;

FIGURE 6 is an enlarged fragmentary plan view of the transfer mechanism's pick-up arm;

FIGURE 7 is an enlarged fragmentary plan view of the sensing mechanism for sensing the end position of articles;

FIGURE 10 is an enlarged fragmentary view partly in section of the air valve and sensing mechanism for sensing the number of articles on the rotating table;

This application is a division of our parent application, Serial No. 583,072 filed May 7, 1956, and which is now Patent No. 3,033,416.

General Arrangement

Figure 1:
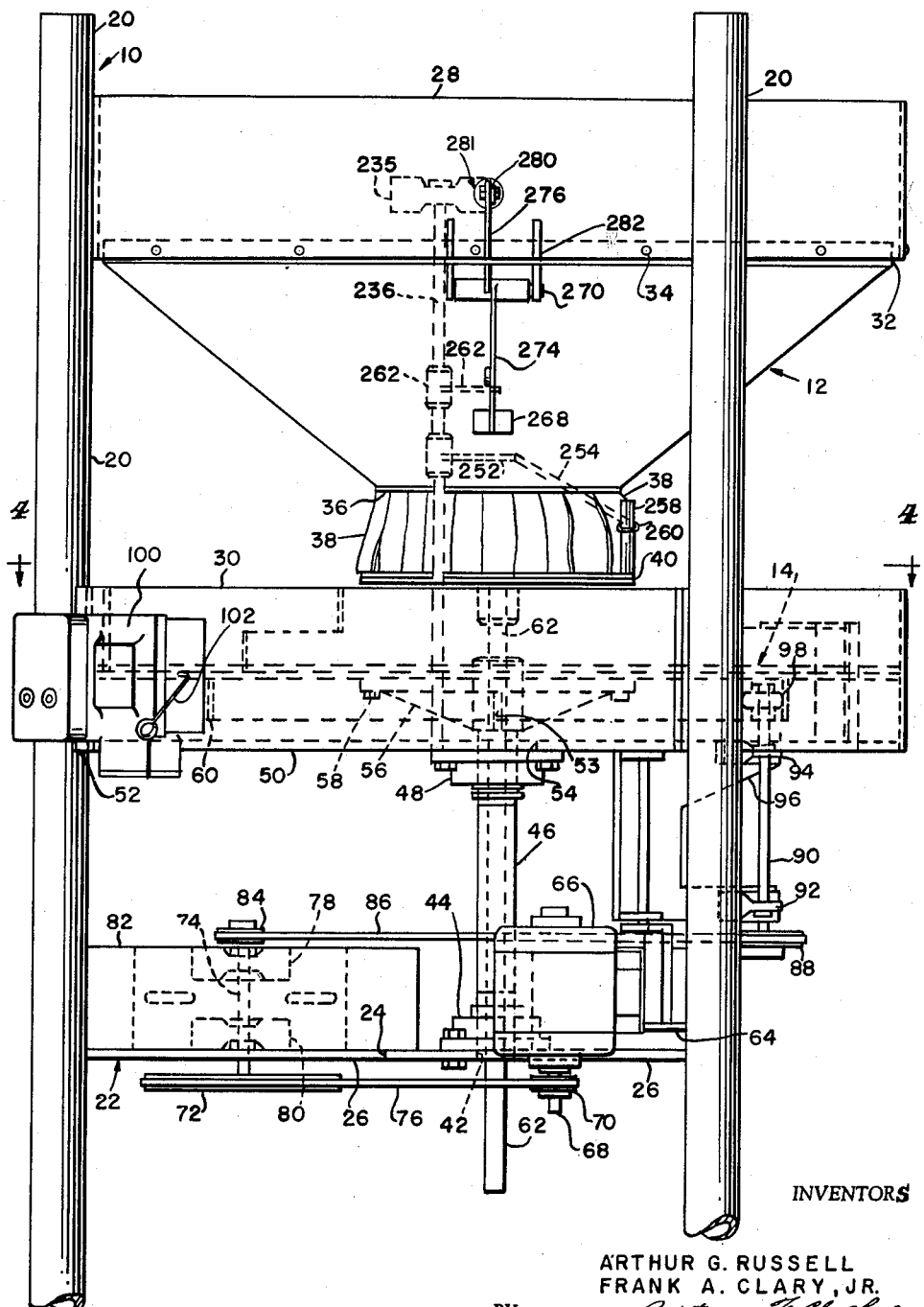
FIGURE 1 is a side elevational view of the mechanism of the present invention disclosing the drive for the rotating table and the hopper for the bulk supply of articles.
Figure 2:
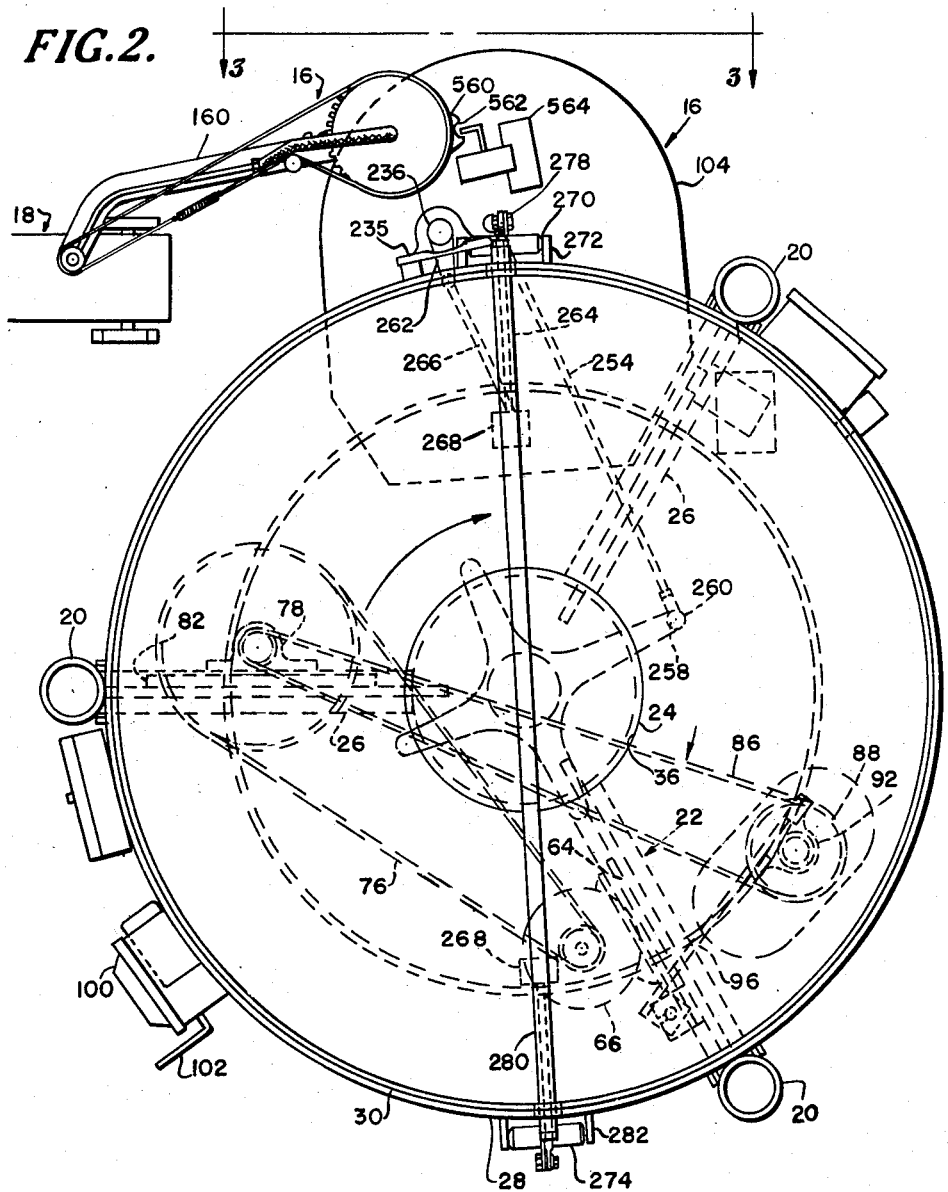
FIGURE 2 is a top plan view of the mechanism of FIGURE 1 showing the hopper for the bulk supply of articles, the transferring mechanism and the takeoff conveyor.

Referring now to the drawings and, in particular, to FIGURES 1 and 2, wherein like character or reference numerals represent like or similar parts, the apparatus of the present invention includes a frame structure generally indicated by the numeral 10, a hopper 12 for a bulk supply of tubular articles, an unscrambling table member 14, a transfer mechanism 16 (FIG. 2) and a take-off conveyor 18. Articles such as tubular bodies, made of flexible material and having one end closed and the other end open, are supported in the hopper 12 and are fed automatically to the unscrambling table member 14 upon demand. The articles which are received in any position on the unscrambling table member 14, are aligned thereon in end-to-end relationship and, once aligned, are then transferred by the rotating table member to an article receiving station generally designated 17 (FIGURES 5 and 7), where the transfer mechanism 16 picks up the articles one by one from the line and discharges them onto the take-off conveyor 18.

The position of the ends of the articles after they have been aligned in end-to-end relationship on the unscrambling table member 14 is sensed prior to the transferring of the articles from the unscrambling table member to the take-off conveyor at the article receiving station 17. Transfer mechanism 16 responds to the sensing of the ends of the articles and will orient the articles as they are being transferred, if such an operation is necessary, so that the articles will be positioned when discharged on the conveyor 18 with their open ends facing in one direction and their closed ends in the opposite direction. The conveyor 18 conveys the articles transferred thereto in a line to subsequent machines for performing various operations on the articles such as labeling and/or filling of the articles.

In more detail, frame structure 10 includes a plurality of vertical standards or posts 20 which support the various elements of the apparatus, as will be subsequently explained. Supported between the three spaced posts or standards 20 is a horizontal spider member generally designated by the numeral 22 and having a central plate 24 from which a plurality of arms 26 radially extend, as best shown in FIGURES 1 and 2. The outer ends of arms 26 of spider member 22 are rigidly secured to the vertical posts or standards 20 by welding or the like. The upper portion of frame structure 10 is provided with a circular hopper ring 28, the hopper ring being rigidly secured to each of the three posts 20 by bolts or the like. Intermediate the upper hopper ring 28 and the lower spider member 22, a circular guide member 30 is rigidly connected to the posts 20 and surrounds the rotatable unscrambling table member 14. Secured to the lower edge of guide member 30 by welding or the like is a circular bed plate 50 which is also welded to the posts 20 at 52. Table member 14 is supported within guide member 30 and above the upper surface of plate 50. Spider member 22, guide member 30, bed plate 50, and hopper ring 28, being integrally attached to the posts 20, form the rigid frame structure 10.

Hopper 12, which is made of a flexible material such as canvas or the like, is attached to the lower edge of the hopper ring, as indicated at 32 in any suitable manner such by bolts or rivets 34. The hopper 12 is shaped like an inverted cone so that its side wall depends downwardly and inwardly from the lower edge 32 of hopper ring 28. The side wall of hopper 12 terminates in a lower horizontal opening 36 through which the tubular articles therein can fall upon occurrence of conditions described in detail later in the specification. Depending downwardly from the periphery of the opening 36 are a plurality of flexible strips 38, the flexible strips terminating adjacent a table member 40, spaced below the hopper 36. The bulk supply of articles in hopper 12 are fed downwardly through its lower opening 36 and are retained on the horizontal upper surface of table member 40 which aids in restraining articles from falling onto the unscrambling table member 14. The flexible strips 38 which may be made of canvas material or the like and which may be weighted at their lower ends, also help retain articles in the hopper and on the table member 40 so that the articles will not continuously fall onto the unscrambling table member 14. Normally, table member 40, which is of a diameter at least equal to the opening 36 in hopper 12 but less than the diameter of unscrambling table member 14, is stationary. However, it may be oscillated on a vertical axis back and forth while the hopper 12 is being agitated to thereby transfer articles onto the unscrambling table member 14 when the latter needs more articles. A more detailed description of the feed of articles from the hopper to the unscrambling table member 14 will follow later in the specification under the heading "Hopper Feed and Agitation."

Referring now to FIGURES 1 and 2, the central plate 24 of spider member 22 is apertured at 42. A bearing 44 is mounted on the plate 24 over the aperture 42, the bearing 44 being adapted to receive the lower end of a rotatable tubular shaft 46. The upper end of tubular shaft 46 passes through a bearing 48 supported on the lower surface of the plate 50, which as previously mentioned, is carried beneath the guide member 30 and rigidly secured thereto and to each of the vertical posts or standards 20 as indicated at 52. The plate 50 is provided with an aperture 54 through which shaft 46 extends. Mounted on the upper end of shaft 46 and keyed thereto as indicated at 53 for rotation therewith is a disk-shaped element 56 which supports the table member or turntable 14. The upper surface of disk 56 is attached to the lower surface of the table member 14 by any suitable means such as the bolts or studs 58. Table member 14 is a flat circular disk of greater diameter than the diameters of the opening 36 of hopper 12 and table member 40. The lower surface of table member 14 is provided with an annular flange member 60, which is concentric of the vertical axis of the table member 14 and extends downwardly therefrom. The table member 40 which is spaced above table member 14, as shown in FIGURE 1, is supported on a shaft 62 which extends downwardly through the tubular shaft 46. Suitable bearings (not shown) are provided between shaft 62 and shaft 46 so that shaft 62 may remain stationary while shaft 46 rotates with the rotating table member 14. By providing table member 14 with the shaft 46 supported in the bearings 44 and 48, respectively, the table member 14 is stabilized and can be rapidly rotated without vibration.

A bracket member 64 rigidly secured to one of the vertical posts 20 is adapted to support an electric motor unit 66. The motor unit 66 through a suitable drive, as will be described, is adapted to rotate the table member 14 and its supporting shaft 46 in the bearings 44 and 48. Motor unit 66 is provided with a vertical drive shaft 68 having a pulley 70 mounted thereon. A second pulley 72 mounted on a vertical shaft 74 is adapted to cooperate with the pulley 70 by means of an endless drive belt or chain 76. Shaft 74 is vertically supported for rotation in pillow blocks 78 and 80 respectively, the pillow blocks being mounted on a plate 82 rigidly carried by one of the arms 26 of spider member 22 and one of the posts 20 of the frame structure 10.

The other or upper end of shaft 74 is provided with a pulley 84 adapted to receive an endless pulley drive belt 86. The pulley belt 86 also cooperate with a pulley 88 carried on a vertical shaft 90. Vertical shaft 90 is supported by pillow blocks 92 and 94 which in turn are carried by a plate 96 rigidly secured to the frame structure 10 by means of the bracket 64 and the lower surface of the bed plate 50. The upper end of shaft 90 extends through an aperture in the bed plate 50 and is provided with a drive roller 98, the peripheral surface of the roller being adapted to engage the inner surface of the annular downwardly depending flange 60 of the table member 14.

As is now evident, the drive for the continuously rotating table member 14 is from the motor unit 66 through the pulleys 70, 72, 84, 88 and the drive roller 98 which frictionally engages the inside wall of the annular flange 60 on the table member 14. By having a friction drive, should the rotating table member 14 jam for any reason, there would be slippage between the drive roller 98 and the wall of the flange 60 and, thus, the pulley drive, and the motor would not be damaged.

A suitable control box 100 for operating the motor 66 may be supported on the outer surface of guide member 30 of frame structure 10, the control box having a conventional off-on lever 102 for supplying electric current from a suitable source of supply to the motor unit.

A more detailed description of the unscrambling mechanism associated with the rotating table member 14 will be described later in the specification under the heading "Unscrambling Mechanism." It will suffice for the present to state that the unscrambling mechanism cooperating with the rotating table member 14 unscrambles the articles fed to the surface of the table member 14 from the table member 40 and hopper 12 and aligns the articles in end-to-end relationship about the periphery of table member 14 so that they may be fed to the pick-up station 17 where their end position is sensed and they are transferred by the transfer mechanism 16 to the take-off conveyor 18.

Figure 3:
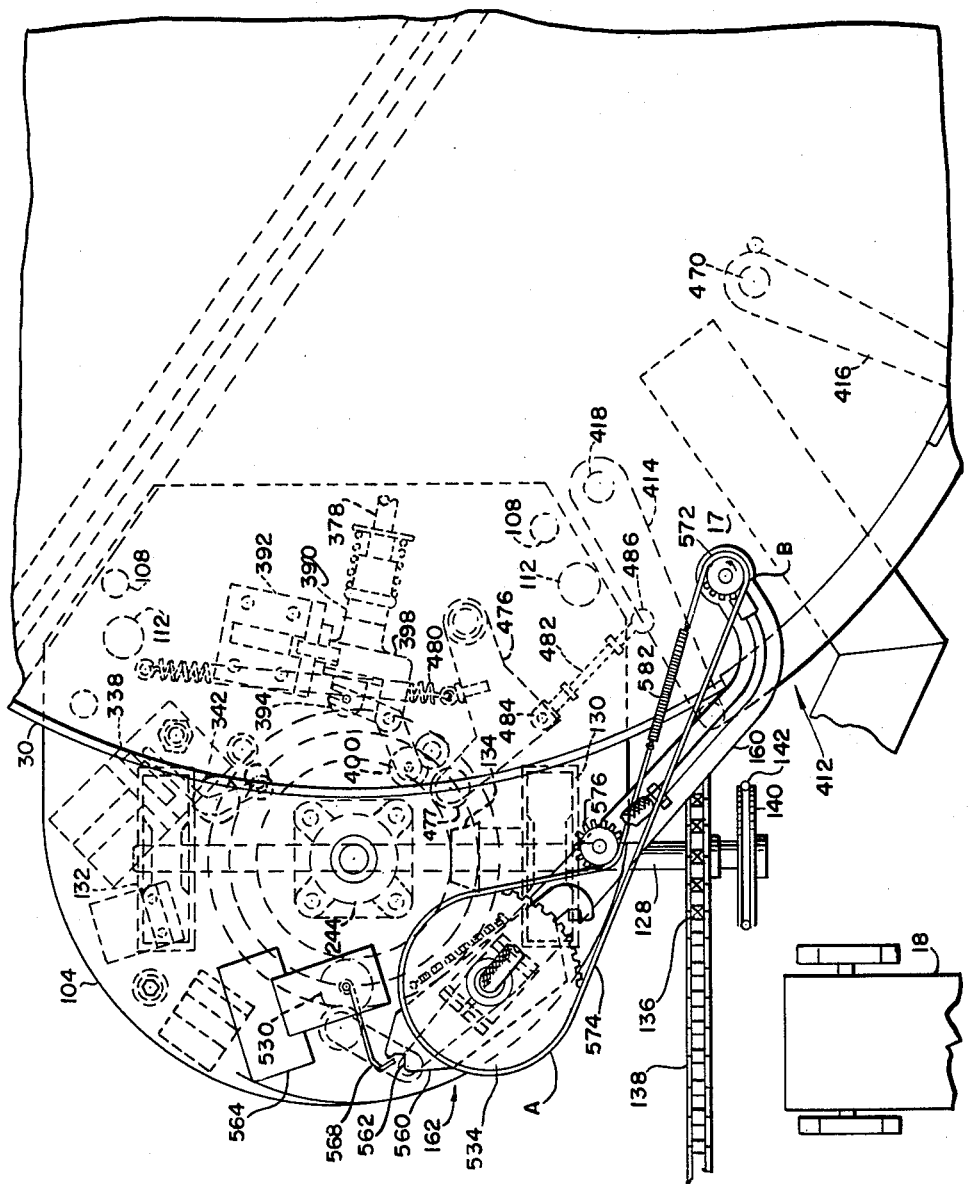
FIGURE 3 is a fragmentary plan view of the transfer mechanism and take-off conveyor.

The transfer mechanism 16 which picks up the articles from the rotating table member 14 and transfers them onto the take-off conveyor 18 is supported on a pair of clock plates 104 and 106 respectively. Referring specifically to FIGURES 2, 3 and 4, the upper clock plate 104 is secured to the under surface of the bed plate 50 of frame structure 10 by studs 108 passing downwardly through apertures 51 in the bed plate and threaded into threaded holes 55 in the clock plate. A plurality of hanger elements 110 are bolted to the lower surface of upper clock plate 104 by studs 112 and depend downwardly therefrom. The lower clock plate 106 is bolted onto the lower ends of the hangers 110 by the studs 114 which extend upwardly therethrough and are received in the threaded holes 115 in the hangers.

Suitable vertically aligned apertured 116 and 118 are provided in the upper and lower clock plates 104 and 106 respectively for receiving a cam drive shaft 120 which is adapted to rotate on a vertical axis. A bearing generally indicated by the numeral 122 and carried by upper clock plate 104 supports the upper end of cam drive shaft 120 as best shown in FIGURE 4, whereas the lower portion of cam drive shaft 120 is supported in a bearing 124 carried by the lower clock plate 106. Cam drive shaft 120 extends through the lower bearing 124 and has a bevel gear 126 keyed thereto for rotation therewith.

A horizontally extending rotatable drive shaft 128 is supported below the lower clock plate 106 by a pair of pillow blocks 130 and 132 mounted on and depending downwardly from the lower surface of the clock plate. A pinion gear 134 is keyed to drive shaft 128 and meshes with the bevel gear 126. As shown in FIGURE 3, the outer end of shaft 128 has a drive gear 136 keyed thereto, the drive gear cooperating with an endless chain drive 138. The chain drive 138 is connected to a suitable source of power (not shown) and is adapted to rotate the cam drive shaft 120 through the drive shaft 128, pinion gear 134 and bevel gear 126.

Figure 9:
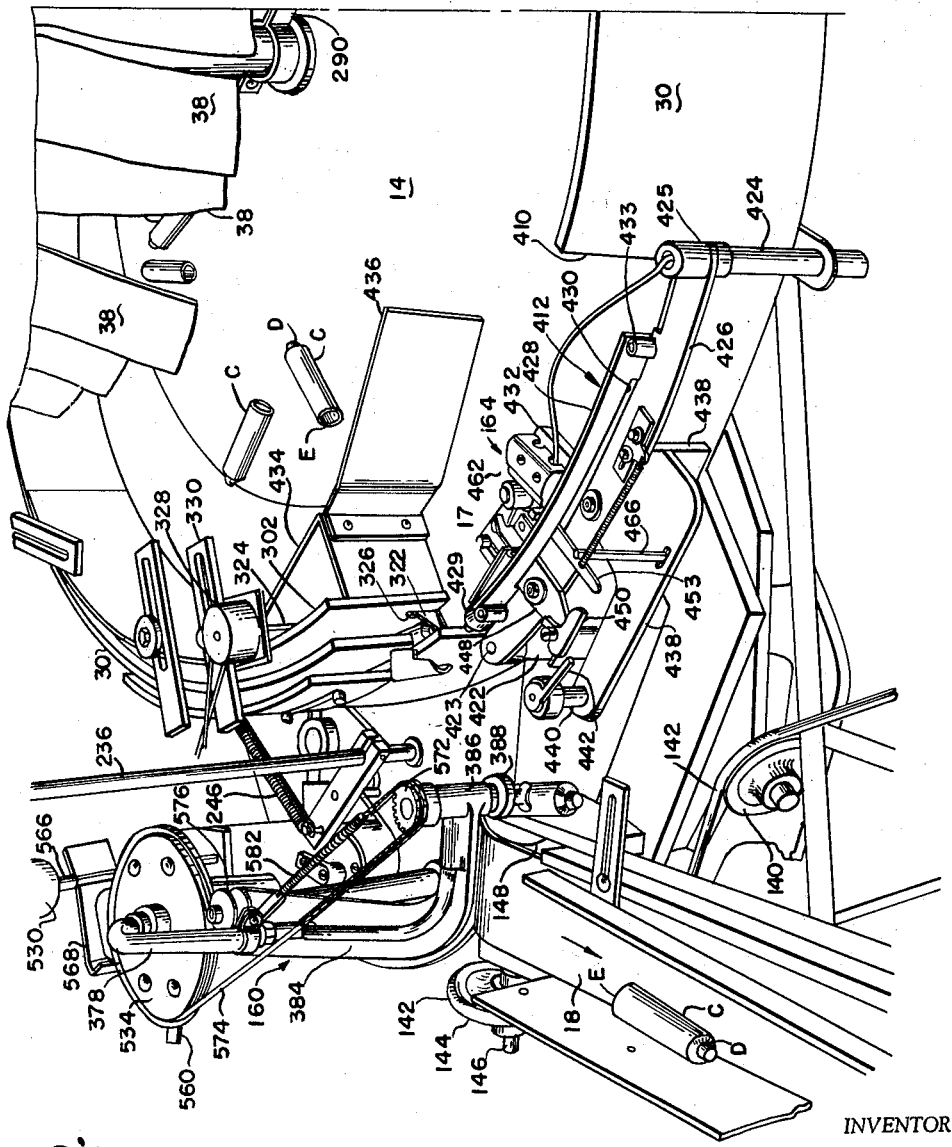
FIGURE 9 is a perspective view similar to FIGURE 8 but showing the pickup arm pivoting with an article toward a discharge position and the sensing mechanism sensing the end position of a subsequent article.

Also mounted on the outer end of drive shaft 128 is a pulley member 140. An endless pulley belt 142 cooperating with the pulley member 140 is adapted to extend around a pulley 144 mounted on a shaft 146 adjacent the conveyor 18. The shaft 146 includes a drive roller 148 over which one end of the conveyor 18 extends. As shown in FIGURE 9, the take-off conveyor 18 is of the endless belt type and is frictionally driven by the roller 148 is the direction of the arrow. By having the pulley 140 mounted on the drive shaft 128, a single source of power may be used to drive both the transfer mechanism 16 and the take-off conveyor 18 in timed relationship with each other.

Cam drive shaft 120 is adapted to support and rotate a plurality of cams to operate various mechanisms of the present invention; however, a detailed description of each of the cams on the cam drive shaft will follow later in the specification when the various operating mechanisms are described in detail.

Clock plates 104 and 106 are provided with a second pair of vertically aligned apertures 150 and 152 respectively, the apertures being adapted to receive the bearings 154 and 156 respectively. Mounted in the bearings 154 and 156 for pivotal movement on a vertical axis, as well as for vertical movement, is a shaft 158 on which an article pick-up arm generally designated as 160 is mounted. The pick-up arm 160 is adapted to pivot from a position over conveyor 18 to a position over the pick-up station 17 on rotary table member 14 and then vertically downward to pick up an article and then upwardly and back over conveyor 18 where the article is discharged.

Associated with the pick-up arm 160 is an article orienting mechanism generally indicated at 162 which is adapted to orient the article at 180° on a vertical axis if the article enters the pick-up station 17 with its end in the wrong direction. The orienting mechanism 162 operates in response to a signal given by a sensing mechanism generally indicated at 164 in FIGURES 8 and 9 and positioned at the pick-up station 17. A more detailed description of the movement of the pick-up arm 160, the operation of the orienting mechanism 162, the operation of the sensing mechanism 164 and the timed relationship of the mechanisms to each other will follow later in the specification.

The operation of the apparatus thus far described is generally as follows: Tubular articles such as the flexible container bodies C having one end closed as indicated at D, and the other end open, as indicated at E are placed in the hopper 12 in an unsorted position and form a bulk supply of articles for the apparatus. The articles C fall through the bottom opening 36 of the hopper 12 and are retained on the table member 40 spaced below the opening. When the rotating table member 14 which unscrambles and feeds articles on its surface to the sensing mechanism 164 has a low supply of articles, this condition is sensed and the table member 40 is caused to oscillate back and forth on a vertical axis. Simultaneously with the oscillation of table member 40, the articles in hopper 12 are agitated by shaking the hopper. Articles on the table member 40 between it and the opening 36 of hopper 12 roll off of the side of the table member and fall onto the rotating table member 14. The articles, by centrifugal force caused by the rotation of table member 14, are rolled outwardly against the guide member 30 and are aligned in end-to-end relationship about the periphery of the table and then fed one by one to the sensing mechanism 164 at pick-up stataion 17. As each article enters the pick-up station 17, its end position is sensed by the sensing mechanism and if the wrong end enters the sensing mechanism, a signal is given to the orienting mechanism 162 carried on the pick-up arm 160 and when the pick-up arm picks up an article from the pick-up station, it will rotate the article 180° about a vertical axis as it is being transferred to a position over the conveyor 18 where it is dropped. Articles C are placed on the conveyor 18 in end-to-end relationship with their closed ends all in the same direction and are fed by conveyor 18 to other apparatus (not shown) where subsequent operations are performed such as labeling, filling and closing.

*Hopper Feed and Agitation*

As previously mentioned, articles C are fed from the opening 36 of hopper 12 and table member 40 onto the rotating table member 14 when the supply of articles on the rotating table member becomes low and there is not a continuous line of articles end to end in the unscrambling mechanism. The articles in the hopper 12 are agitated while the table member 40 is oscillated back and forth on a vertical axis and this causes articles supported on the table member 40 and in the throat of the hopper to be discharged onto the rotating table member 14 through the flexible canvas flaps 38 depending downwardly from the hopper.

Referring now specifically to FIGURES 5 and 10, a sensing mechanism generally indicated by the numeral 166 is provided adjacent the periphery of the rotating table member 14 for sensing the number of articles on the table so that when the supply of articles becomes low, a signal can be given to gently shake the hopper 12 and oscillate the table member 40. In more detail, the sensing mechanism 166 includes a pair of air valves 168 and 170 supported at spaced points above the upper surface of rotating table member 14 by means of a clamp element 172 operatively connected to the frame structure 10. The clamp element 172 which supports the valve 168 is connected directly to the guide member 30 and is provided with a downwardly depending vertical shaft 174 on which the valve is supported. On the other hand, the clamp 172 which supports the valve 170 is attached to a bracket member 176 which in turn is connected to the frame structure 10 through the guide member 30. Bracket 176 bridges a portion of the rotating table member 14 and also supports a gate motor 178, the purpose of which will be described later in the specification under the heading "Unscrambling Mechanism."

Each of the valves 168 and 170 are identical and, therefore, the description of the valve 168 shown in FIGURE 10 will suffice for the description of the valve 170. Referring now to FIGURE 10, valve 168 contains a body member 180 having a passage 182 therein which is provided with a fitting 184 onto which a suction conduit 186 is connected. The passage 182 of body member 180 communicates with an axial passage 188 which is provided with a valve seat 190. A passage 188 through valve seat 190 communicates with a reduced outlet passage 192 which opens to the outer lower surface of the valve body member 180. An article engaging feeler arm 194 is pivotally connected to the valve body member 180 as indicated at 196. The lower portion 195 of feeler arm 194 is adapted to engage the container C and be pivoted upwardly in a counterclockwise direction as viewed in FIGURE 10. The upper portion 198 of feeler arm 194 is adapted to seat against and close the outlet passage 192 when there is no container urging the feeler arm in a counterclockwise direction. Valve seat 190 in valve body member 180 is adapted to cooperate with a needle valve element 200 which may be fixedly adjusted to restrict the flow through the valve 168 depending on the amount of suction in line 186.

Figure 16:
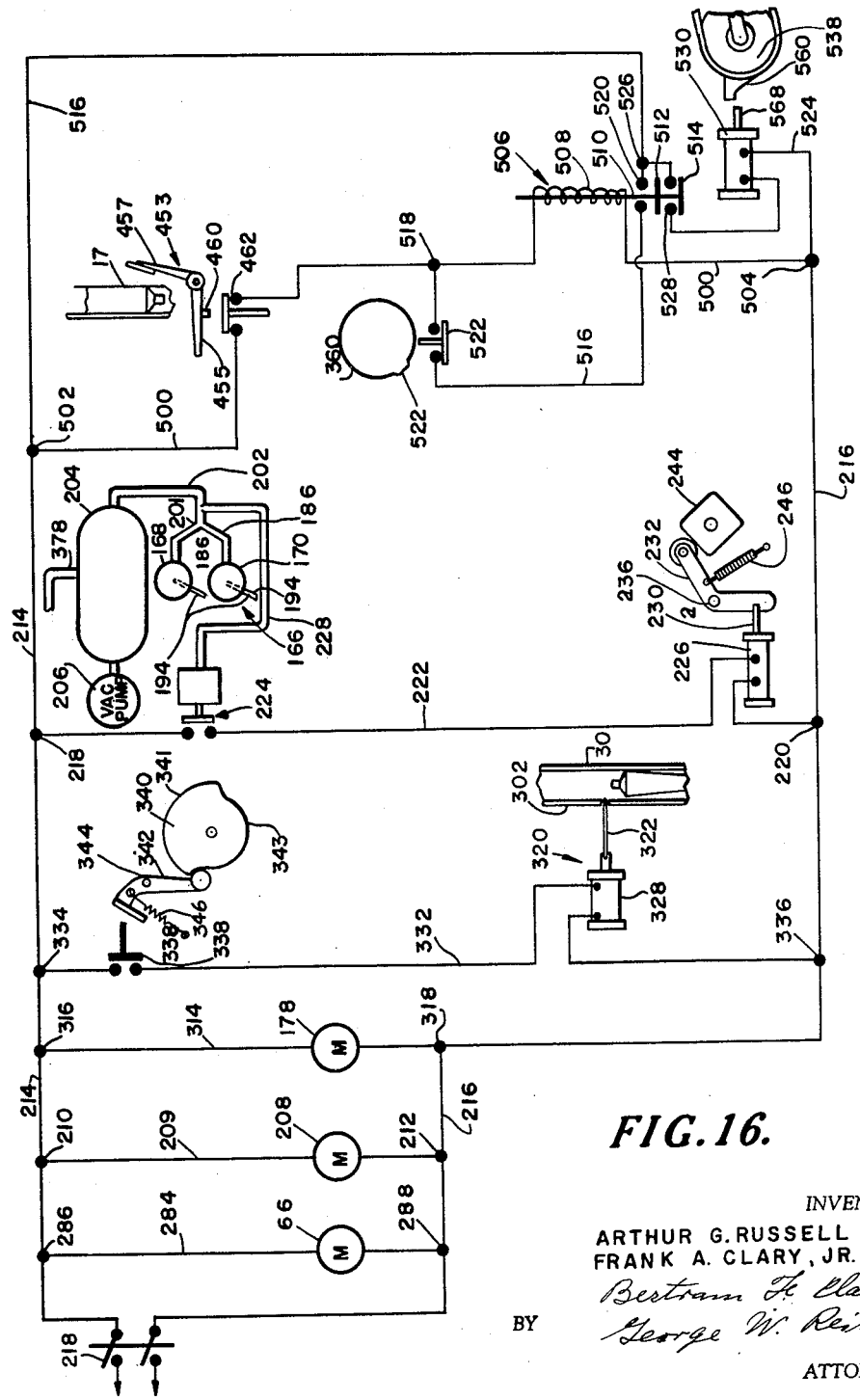
FIGURE 16 is a wiring diagram of the apparatus of the present invention.

Referring now to FIGURE 16, it will be seen that each of the suction conduits 186 leading off of the valves 168 and 170 respectively communicates at 201 with a manifold 202 which leads to a vacuum accumulator or storage tank 204 or the like, and a vacuum pump 206. Vacuum pump 206 is operated by an electric motor 208 which in turn is connected by means of a current conductor of wire 209 at terminals 210 and 212 to current conductors or wires 214 and 216 respectively.

As shown in the wiring diagram, FIGURE 16, current conductors or wires 214 and 216 are connected to a suitable source of supply, not shown, through an on-off switch 218. When the switch 218 is closed, the wires 214 and 216 are in circuit and, consequently, the vacuum motor 208 starts and operates the vacuum pump to evacuate the vacuum accumulator tank 204. Also connected in the circuit of wires 214 and 216 at the terminals 218 and 220, respectively, is a wire or line 222. A vacuum-operated switch 224 is provided in the wire or line 222, this switch being normally open so that current cannot pass through the wire. A solenoid 226 is also provided in the line 222 and when the switch 224 is closed, the solenoid is energized.

Referring back to the vacuum manifold 202, it will be noted that a suction conduit 228 is connected thereto and extends to the vacuum-operated switch 224. When containers are traveling on the rotating table member 14, and the lever arms 194 are raised thereby, air can flow through the valves 168 and 170 and consequently, there will be no vacuum in the suction conduit 228 leading to the vacuum-operated switch 224. However, when articles are not present on table member 14, the feeler arms 194 will drop down to the position shown in FIGURE 10, and in this position, their upper ends close the ports of passages 192. When both feeler arms 194 are down, vacuum is applied to the line 228 through line 202 and, thus, switch 224 is closed, completing the circuit through the line 222 to energize the solenoid 226. On the other hand, when either one of the feeler arms 194 is up, the switch 224 will be open because the vacuum will be released from the conduit 228.

Solenoid 226, as diagrammatically shown in FIGURE 16 and as shown in detail in FIGURE 5, is provided with a latch member 230, the latch member, when solenoid 226 is de-energized, normally engaging a cam follower member 232 and holding the cam follower out of engagement with a cam 244. When the solenoid 226 is energized by the closing of switch 224, the latch member 230 is released from the cam follower so that the cam follower can engage the cam and follow the contour of its dwells and lobes.

Referring now to FIGURES 1, 2, 5 and 8, it will be noted that the upper clock plate 104 carries a vertical shaft 236, the shaft being supported for oscillating rotation with respect to the plate by means of a bearing 238. The upper end of shaft 236 is supported in a pillow block 235 mounted on the side wall of hopper ring 28. Mounted on the shaft 236, as indicated at 240, is the cam follower 232 which extends radially of the vertical axis of the shaft. The cam follower is provided with a downwardly depending lug or roller 242 which is adapted to engage the cam surface of cam 244. A spring 246, connected at one end as indicated at 248 to the clock plate 104 and at the other end to the outer end of cam follower 232, normally urges the cam follower's lug or roller into engagement with the cam 244. However, the latch 230 is adapted to engage the cam follower 232, as shown in FIGURE 5, when the cam follower is riding on one of the lobes 250, and the solenoid 226 is de-energized. When the solenoid 226 is energized, latch 230 rotates and releases cam follower 232 and allows it to follow the contours of cam 244 to oscillate the shaft 236 back and forth on a vertical axis.

Cam 244, as shown in FIGURE 4, is mounted on the portion of cam shaft 120 extending through the bearing 122 on upper clock plate 104. Since the cam 244 rotates continuously with the shaft 120, it will cause shaft 236 to oscillate when the cam follower is released by the latch 230. On the other hand, the cam 244 will also assist in relatching when latch 230 is returned to the position shown in FIGURE 5, as lobes 250 of the cam will move the cam follower 232 to a position where it is engaged by the latch and held out of engagement from the dwells of the cam against the spring tension of spring 246.

Connected to the upper end of shaft 236 is a radially extending pivot arm 252, pivoted by the shaft on a vertical axis. A connecting rod 254 having a bearing end 256 is connected to the outer end of arm 252, the other end of the connecting rod being connected to a pin 258 extending upwardly from the periphery of the table member 40. The connecting rod has a pivotal connection with the pin 258 as indicated at 260 in FIGURE 2. Oscillation of shaft 236 back and forth will cause the connecting rod to reciprocate, and, consequently, cause the table member 40 to oscillate back and forth on its support shaft 62.

Figure 8:
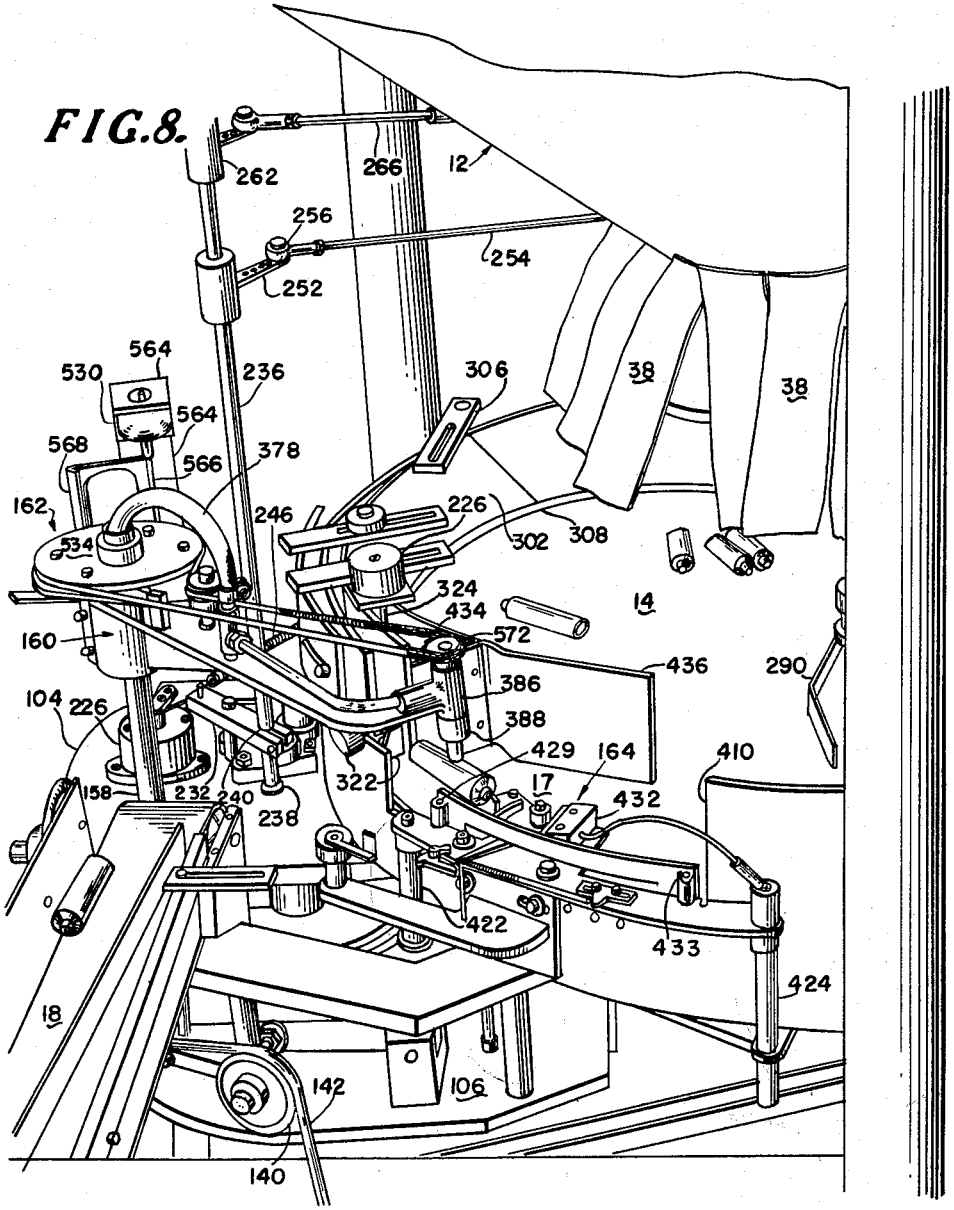
FIGURE 8 is a fragmentary perspective view of the present invention disclosing the pick-up arm of the transfer mechanism over the rotating table and picking up an article.

Also attached to the shaft 236 above the pivot arm 252 is a second radially extending pivot arm 262. The outer end of pivot arm 262 is connected to a paddle member 264 by means of a connecting rod 266 (FIGURES 2 and 8). Paddle member 264 has an enlarged end 268 which engages the flexible side wall of hopper 12. The other end of paddle member 264 is pivotally connected on a horizontal pivot 270 to a bracket member 272 supported from the rigid hopper ring 28. When shaft 236 is oscillated by cam 244, it will also cause the connecting rod 266 to reciprocate back and forth and the rod, being connected to the paddle, causes the paddle to pivot and gently tap the side walls of the hopper to thereby agitate the articles therein.

A second paddle member 274 may be provided diametrically opposite the paddle member 264 for tapping the other side of hopper 12. Paddle member 264 is provided with a lever arm 276 which is pivotally connected as indicated at 278 to a shaft or connecting rod 280 (FIG. 2), extending horizontally across the upper portion of hopper 12 through suitable openings 281 in the hopper ring 28 (FIG. 1). The other end of shaft 280 is connected to a similar upwardly extending lever arm 276 on the paddle 274 to pivot on its pivot bracket 282 which is also connected to the hopper ring 28. Movement of paddle 264 is transferred from its lever arm 276 to the connecting rod 280, reciprocating the same, and causing the other paddle member 274 to also pivot and tap gently on the opposite side of the hopper.

As is now evident, when the rotating table member 14 needs more articles, the sensing mechanism 166 is operated, causing vacuum to be applied to switch 224, closing the same, and energizing the solenoid 226. Latch 230 is rotated in a counterclockwise direction, releasing cam follower 232 and permitting the shaft 236 to oscillate with the came follower 232 as it follows cam 244. Oscillation of the shaft 236 causes the sides of the flexible hopper 12 to be gently tapped by paddles 264 and 274, agitating the articles therein and, simultaneously, the normally stationary table member 40 is also oscillating on a vertical axis to cause the articles to drop therefrom onto the rotating table member 14 through the downwardly depending flaps 38.

*Unscrambling Mechanism*

Referring now to FIGURES 1, 5 and 16, the unscrambling mechanism which is associated with the rotating table member 14, provides means for continuously positioning the articles dropped onto the table member so that they are arranged and transferred about the periphery of the table in an end-to-end relationship, regardless of which end of the article is adjacent the end of a successive article. A description of the orientation of articles to a position where the closed end of the articles are all in the same direction will appear later in the specification under the heading "Orientation of an Article on the Pick-Up Arm." The articles, after being arranged in end-to-end relationship by the unscrambling mechanism, are fed by the rotating table member 14 one at a time to the pick-up station 17 where they are transferred therefrom by the transfer mechanism 16 to take-off conveyor 18.

As previously mentioned, rotating table member 14 is caused to rotate rapidly by the electric motor unit 66 through the friction drive of roller 98. As shown in FIGURE 16, motor unit 60 is connected into the line circuit 214 and 216 by means of a wire or conductor line 284 connected to the terminals 286 and 288 respectively. Closing the start-stop switch 218 immediately supplies current to the motor unit 66 and the table member 14 will continuously rotate. Vacuum pump motor unit 208 and gate motor 178 start simultaneously with table motor unit 66 upon closing of the switch 218.

Articles dropped on the table member will, because of centrifugal force created by the rotating table member 10, normally move outwardly toward the outer periphery of table member 14. To assist in causing articles to move outwardly on the table member 14, a baffle member 290 may be provided above the upper surface of table member 14, the baffle member being connected to the shaft 62 which is normally stationary with respect to the counterclockwise rotation of table member 14. Baffle 290 extends outwardly at an angle to the radius of table member 14 just about its upper surface to a point short of its periphery and urges containers carried by the table member toward the periphery.

As previously mentioned, guide member 30 surrounds the periphery of the table member 14 and extends above the upper surface of the table member a sufficient distance so as to retain articles on the table member. A curved baffle member 294 supported by clamps 296 and 298 extends from a point of contact 292 on the wall of guide member 230 inwardly toward the axis of table member 14 to a point adjacent the position of the inlet gate motor 178, as shown in FIGURE 5. The clamps 296 and 298 are rigidly attached to the guide member 230 and the baffle member 294 extends downwardly from the clamps to a position where its lower edge is spaced equal to the diameter of one article but not greater than the diameter of two articles. Baffle member 294 prevents articles stacked on top of one another from entering an area 300 where the articles C are unscrambled.

An arcuate guide member 302 suitably supported by brackets 304 and 306 is spaced inwardly of guide member or wall 30 a distance equal to at least one but not greater than two diameters of an article being transferred by table member 14. The arcuate guide member 302 extends from a position adjacent the area 300 to a position adjacent the pick-up station 17 and defines a passageway where articles can only pass lengthwise in end-to-end relationship. The lower edge 308 of guide member 302 (FIG. 8) is spaced above the upper surface of rotating table member 14 only enough distance to give it clearance with the table member and, consequently, articles on the surface of table member 14 cannot slip radially of the table member under the guide member 302 into the passageway it defines with the guide wall 30.

As previously mentioned, gate motor 178 is carried on the bracket 176 which bridges across the table and, as clearly shown in FIGURE 5, the gate motor is positioned adjacent the inlet of the passage defined by the guide members 30 and 302. Gate motor 178 is provided with a vertical drive shaft 310 depending downwardly therefrom on which is mounted a rubber-covered wheel or roller 312. The roller 312 is positioned adjacent one side of the entrance of the article passageway and rotates in a clockwise direction, as viewed from FIGURE 5, which is opposite to the direction of rotation of table member 14. By having the roller 312 rotate in an opposite direction, it will permit only one article at a time to enter lengthwise into the passageway. Other articles engaging the roller simultaneously with one entering the passageway are thrown inwardly toward the center of table member 14, and, thus, the area adjacent the entrance of the passageway is kept free of jams.

Referring now to FIGURE 16, it will be noted that the gate motor 178 is connected into the circuit 214 and 216 by means of the wire or conductor 314 connected to the terminals 316 and 318. As previously mentioned, when switch 218 is closed energizing table motor unit 66, vacuum pump motor 208 of vacuum pump 206, it will also energize the gate motor unit 178 and the roller will continuously operate so long as the table member 14 is rotating.

As the articles are carried by the rotating table member 14 in a counterclockwise direction and enter the passageway between the guide members 302 and 30, they are arranged in end-to-end relationship. They continue to be transferred in this relationship until they approach the discharge end of the passageway adjacent the pick-up station 17. However, the successive articles do not continuously flow into the pick-up station 17 but are intermittently permitted to enter the pick-up station by means of a discharge gate 320 which will be described under the subsequent heading "Article Feed to Orientation Sensing Mechanism."

*Article Feed to Orientation Sensing Mechanism*

Discharge gate 320 operates in timed sequence with the pivoting pick-up arm 160 so that it prevents an article from entering the pick-up station 17 while there is still an article at the pick-up station being sensed and waiting to be picked up by the pick-up arm. Discharge gate 320 includes an L-shaped member 322 which is adapted to pivot on a vertical shaft 324 through a slot 326 in the wall or guide member 302. A shaft 324 extending downwardly from and adapted to be rotated by a rotary type solenoid 328 supports the gate 320 for pivotal movement. Solenoid 328 is suitably supported on a bracket member 330 carried by the guide member 30 of frame structure 10.

Referring now to the wiring diagram of FIGURE 16, it will be noted that solenoid 328 is in a wire or conductor line 332 connected to the lines 214 and 216 by the terminals 334 and 336. Also in the line 332 is a normally open microswitch 338. A cam 340 mounted on the rotating cam shaft 120 (FIGURES 4 and 12) actuates a cam follower 342 to open and close the microswitch 338. Cam follower 342 which is pivotally mounted to the frame structure 10 in any suitable manner, as indicated at 344, is constantly spring-urged into engagement with cam 340 by means of a spring 346 connected to the cam follower and to a portion of the stationary frame structure 10. As shown in the cam timing diagram in FIGURE 15 and in cam diagram FIGURE 12, the cam 340 is designed so as to de-energize the solenoid 328 and, thus, release the gate 322 to permit an article to enter the pick-up station 17, between approximately 184° and 337° of its rotation.

Figure 12:
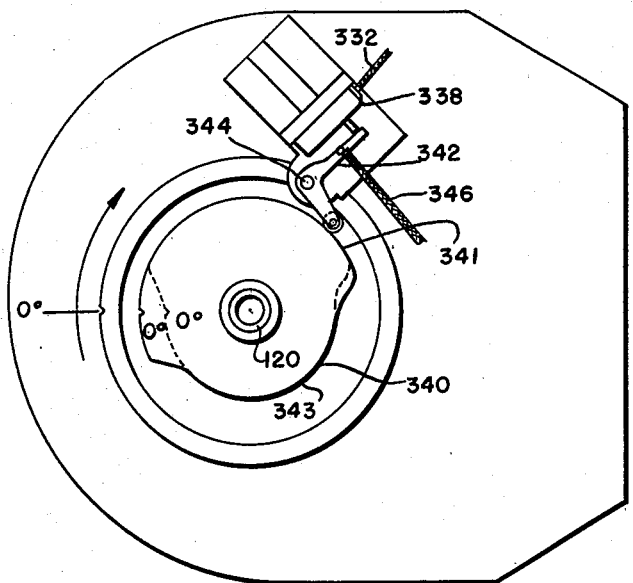
FIGURE 12 is a view similar to FIGURE 11 but showthe gate operating cam for the inlet gate to the sensing mechanism.

As shown in FIGURE 12, switch 338 would be closed as the cam follower is traveling on the lobe 341 of cam 340 and, consequently, the solenoid 328 would be energized and gate 322 closed. In the wiring diagram, FIGURE 15, the cam follower 344 is riding in a dwell 343 of the cam 340 and, consequently the switch 338 is open and the solenoid 328 de-energized, thus, opening the gate 322 to permit passage of one article into the pick-up station 17.

*Pick-Up Arm Control*

As previously mentioned, the pick-up arm 160 is mounted on the vertical shaft 158 and is adapted to swing from a position over the endless belt type take-off conveyor 18 to a position over the pick-up station 17 on the rotating table member 14. When the pick-up arm is over the pick-up station 17, the shaft 158 supporting the arm is lowered so that the arm can drop down and pick up an article positioned at the pick-up station 17. The arm is raised vertically by vertical movement of the shaft 158 and the shaft then pivots the arm 160 to a position over the take-off conveyor 18 where the article is discharged in its proper oriented position.

Figure 11:
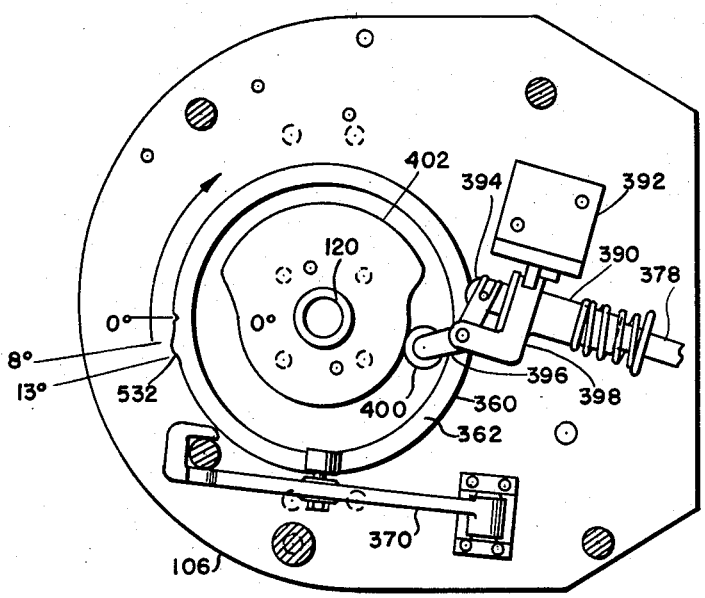
FIGURE 11 is a fragmentary plan view disclosing the cam lower clock plate with the vacuum pick-up arm vertical lift cam and the vacuum pick-up valve cam thereon.
Figure 13:
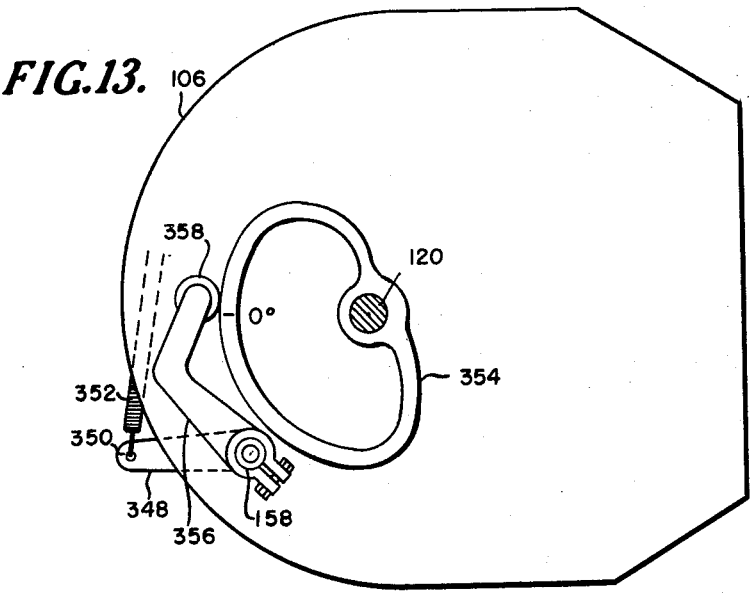
FIGURE 13 is a view similar to FIGURE 11 but showing the vacuum pick-up arm horizontal swing cam.

Referring now to FIGURES 4, 11 and 13, it will be noted that the vertical pivot shaft 158 extends below the lower clock plate 106. At the lower end of the shaft 158 an arm 348 extends radially therefrom and is fixed thereto. The outer end 350 of arm 348 is connected to one end of a spring 352, the other end of the spring being connected to the stationary frame structure 10 in any suitable manner. The spring 352, as viewed in FIGURE 4, tends to rotate the shaft 158 in such a direction that the horizontal pick-up arm 160 would swing toward the take-off conveyor (not shown in FIGURE 4).

A cam 354 mounted on cam shaft 120 for rotation therewith is provided for causing the pivoting or swinging of pick-up arm 160 from a position over conveyor 18 to a position over the pick-up station 17 and back. Rigidly mounted on the pick-up arm pivot shaft 158 is a cam follower 356 having a roller 358 which engages the surface of cam 354. The spring 352, which normally tends to rotate the shaft 158 in a direction to cause the pivoting of the pick-up arm toward the take-off conveyor 18 in reality merely causes the cam follower 356 and its roller 358 to constantly engage the surface of cam 354 so that it can follow the same. Cam 354 is quite thick, as compared to the roller 358, as shown in FIGURE 4, but since the shaft 158 must move from one vertical position to another vertical position, the cam 354 must necessarily be thick so that the roller will always engage the cam regardless of the vertical position of shaft 158. In FIGURE 4, the full line position of cam follower 356 discloses the shaft 158 at the uppermost point of its vertical travel and, consequently, the pick-up arm is at its uppermost point above the conveyor 18 and table member 14. The dotted line position of cam follower 356 would be the position of the cam follower with respect to the cam 354 when the shaft 158 has been lowered so that the pick-up arm can engage and pick up an article at the pick-up station 17 on rotating table member 14.

Figure 15:
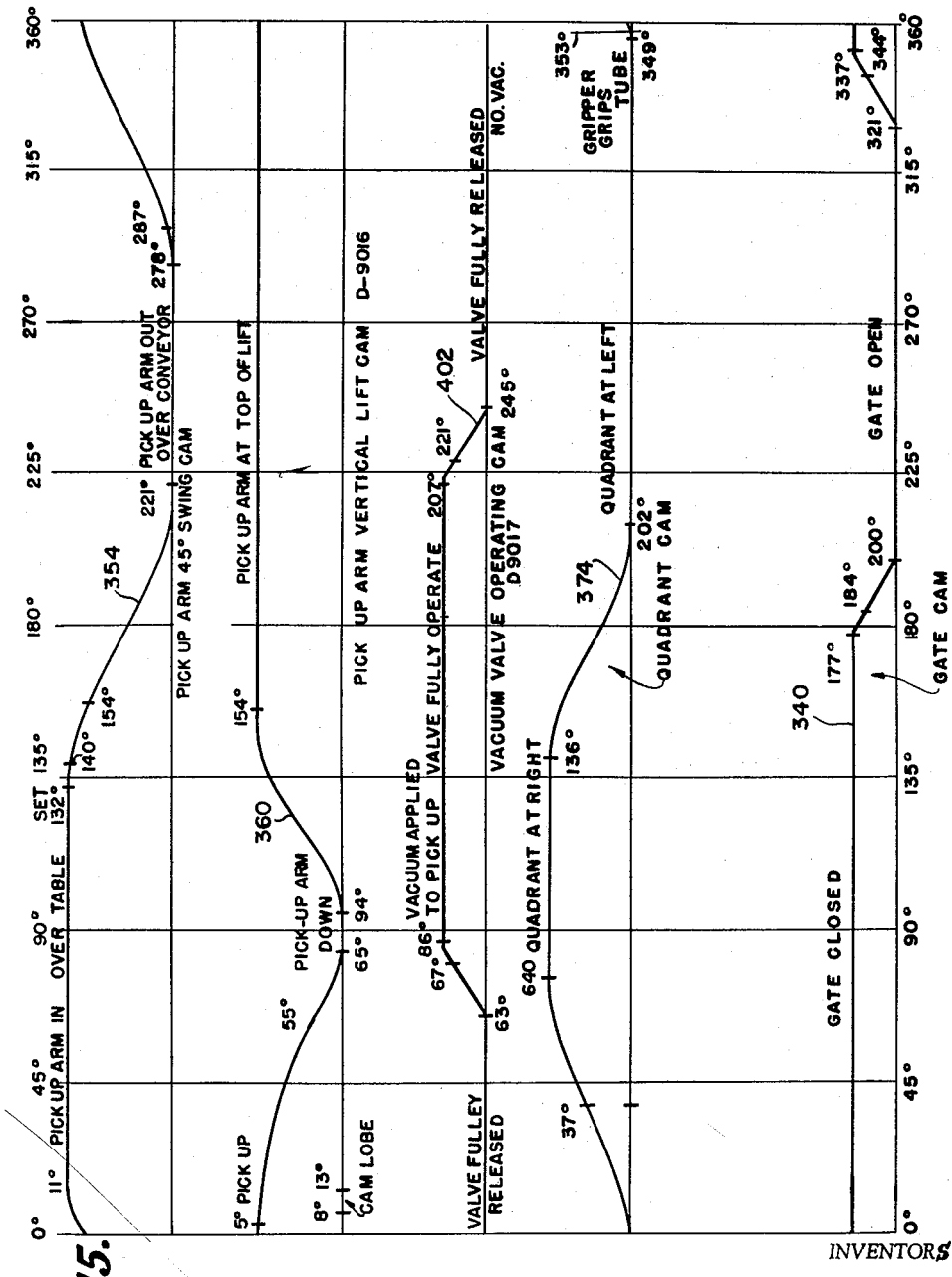
FIGURE 15 is a cam development timing diagram.

Referring now to FIGURE 13, which discloses a diagrammatic plan view of cam 354 and to FIGURE 15 which shows the layout of cam 354, it will be noted that the swing cam between 11° and 132° of its rotation will have moved the pick-up arm 160 to a position over the rotating table member 14. At 132°, the cam starts the rotation of pick-up arm 160 back toward the take-off conveyor 18 and from 221° of its rotation to 278° of its rotation it is out over the take-off conveyor. From 278° of its rotation back to 11° of its rotation, the cam is moving the pick-up arm from out over the take-off conveyor 18 to a position back over the pick-up station 17 on rotating table member 14.

A pick-up arm vertical lift cam 360 mounted on cam shaft 120 just above the upper surface of lower clock plate 106 is provided for raising and lowering pivot shaft 158. The cam 360 is provided with a cam surface 362 which has a rise and a dwell thereon for raising and lowering the shaft 158.

A collar 364 is rigidly secured to the shaft 158 below the previously mentioned cam follower 356. A bracket member 366 mounted on the upper surface of clock plate 106 is provided with a horizontal pivot 368 on which is pivoted a cam follower 370. The cam follower 370 carries with it a roller 372 which engages the cam surface 362 of cam 360. The outer end of the cam follower or lever 370 is provided with a projection 374 which engages the under surface of collar 364. Since the cam roller is positioned between the projection 374 and the horizontal pivot 368 of cam follower 370, movement of the cam 360 will cause the cam follower 370 to pivot on a horizontal axis and its end will engage the collar 364 and raise or lower the shaft 158. In order that the shaft 158 is in constant engagement with the projection 374 on cam follower 370, a coil spring 376 is provided around the lower portion of the shaft 158. Spring 376 has one of its ends bearing against the clock plate 106 while its other end bears against the arm 348 carried on the shaft 158. Consequently, the spring normally urges the shaft 158 downwardly with respect to the clock plate and will cause the collar 364 to abut against the projection 374 on the cam follower lever 370.

Referring now to FIGURE 11 which shows a diagrammatic plan view of cam 360, and to FIGURE 15 which shows the layout of cam 360, it will be noted that when the cam 360 rotates from 5° to 65°, the cam follower 370 will be pivoting downwardly and, thus, the shaft 158 is lowered together with its pick-up arm 160. From 65° rotation to 94° rotation of cam 360, the cam follower 370 is following the lowermost point of the dwell of cam 360 and, consequently, the pick-up arm 160 is at its lowermost point of vertical movement. From 94° to 154° rotation of cam 360, the pick-up arm is being raised toward the top of its vertical movement, and from 154° of its rotation to 5°, it will be in the top position of its vertical movement.

In FIGURE 15, it will be noted that when the pick-up arm vertical lift cam 360 has lowered the pickup arm 160 to its lowermost position, the horizontal swing cam 354 has already moved the pick-up arm to a position over the table member 14 and, more particularly, over the pick-up station 17. On the other hand, when the vertical lift cam 360 has moved the pick-up arm 160 to its top vertical position, the horizontal swing cam 354 then begins to swing the pick-up arm toward and over the take-off conveyor 18. The pick-up arm 160 will be pivoted to a position vertically spaced from and over take-off conveyor 18, and when in this position, the article being transferred thereby is discharged onto the take-off conveyor 18. The pick-up arm 160 then swings back toward the rotating table member 14 still in its raised position. It is not until after the pick-up arm gets over the table member 14 that the cam 360 lowers the pick-up arm 160 to a position where it can engage and pick up an article.

The pivot shaft 158 for pick-up arm 160 is tubular and extending upwardly through the tubular shaft is a suction conduit 378. The suction conduit 378 extends from the vacuum storage tank 204 (FIG. 15) to the bottom of the tubular shaft 158 in any suitable manner. The end 380 of the conduit 378 which extends out of the upper end of the shaft 158 is adapted to be received by one end of an L-shaped fitting 382 carried by the pick-up arm 160. The other end of the L-shaped fitting receives another suction conduit 384 which extends outwardly along the arm 160 to an end fitting 386 having an article engaging vacuum cup 388 for picking the article from its awaiting position at station 17. When suction is applied to the line 378, the vacuum cup 388, when in engagement with an article, will pick up and retain the article until such time as suction is relieved in the conduit 378.

An air valve 390 (FIG. 11) is provided in suction line or conduit 378 for applying and cutting off the suction to article engaging cup 388. In more detail, air valve 390 is carried by a bracket 392 supported on the lower clock plate 106. The valve actuating arm is moved by a cam follower 396 pivotally mounted to a bracket 398 carried by the valve 390. The outer end of cam follower 396 is provided with a roller 400 which engages the cam surface of a vacuum cam 402. As shown in FIGURE 4, vacuum cam 402 is positioned above lift cam 360 and is carried by cam shaft 160 for rotation therewith.

Referring now to FIGURE 15, it will be noted that from 63° rotation of cam 402 to 88° rotation, the cam follower 396 is moving to open the valve 390 and permit suction to be applied through the line 378 to the article engaging cup 388. From 88° rotation of cam 402 to 207° rotation, the valve 390 is maintained fully open and suction is being applied to the article engaging cup 388. From 207° to 245° of rotation of cam 402, the cam is moving the cam follower 396 to a position closing the valve 390 and releasing the vacuum in the suction conduit 378. At 245° the cam 402 has moved the cam follower to a position where the valve 390 is fully closed and there is no vacuum in the line or conduit 378.

Referring now to the various cam layout diagrams of FIGURE 15, it will be noted that vacuum is applied to the conduit 378 when the pick-up arm is over table member 14 and is down to a position where the cup 388 is engaging the side wall of an article. The pick-up arm then moves vertically and pivots or swings horizontally with the vacuum being maintained to a position over take-off conveyor 18 and when in this position, the valve 390 is released and the article will drop from the article engaging member 388 onto the conveyor. Thus, it can be seen that the cams 354, 360 and 402 are positioned on the cam shaft 120 in such a manner that a complete sequence of operation can be made when the cams are rotated 360°. Stated another way, the cams permit, in one revolution of the cam shaft 120, the movement of the pick-up arm 160 from a position over the conveyor 18 where the vacuum is released to drop an article to a position over the pick-up station 17 and then downwardly where vacuum is applied to pick up an article. The pick-up arm then moves upwardly with the article and with the vacuum still applied, pivots to a position over the take-off conveyor 18. When pick-up arm 160 is over the take-off conveyor 18, vacuum is released and the article dropped.

*Article Orienting Sensing Mechanism and Operation*

Referring now to FIGURES 7, 8 and 9, the guide member 30, which encircles the periphery of rotating table member 14 and forms its side wall, is provided with a cut-out portion 410 (FIGURE 8) extending from a point adjacent gate 320 to a point aft of the pick-up station 17. The cut-out portion 410 extends downwardly to a position at least level with the surface of the rotating table member 14. A quadrant member generally indicated by the numeral 412 is positioned adjacent the cut-out portion 410 of guide member 30 for supporting the sensing mechanism 164.

In more detail, the quadrant member 412 is adapted for arcuate movement fore and aft of the cut-out portion 410 by means of a pair of pivot arms 414 and 416 respectively, the pivot arms being pivotally connected in any suitable manner to the frame structure 10 as indicated at 418 and 420. Mounted on the outer end of each of the pivot arms 414 and 416 are upstanding post members 422 and 424. An arcuate flat base plate 426 is mounted on the upper ends of the post members 422 and 424 as indicated at 423 and 425 (FIGURE 9). The base plate 426, which is horizontally disposed, is provided with an arcuate-shaped guide rail 428 rigidly mounted thereto at 429 and 433 having a slot 430 extending a substantial portion of its length. Rail 428 provides a side wall for the table member 14 where it has its cut-out portion 410. The arcuate-shaped base plate 426 is provided with a bracket member 431 fixedly secured thereto and having a portion 432 which extends inwardly and over a portion of the table member 14 for supporting the sensing mechanism 164.

A baffle element 434 surrounding the solenoid shaft 324 and gate 320 is attached to the guide member 302. A second baffle element 436 secured to baffle element 434 extends rearwardly therefrom above table member 14 to a position adjacent the sensing mechanism 164. The baffle element 436 prevents articles on table member 14 from entering the pick-up station 17 directly from the table member and also protects the sensing mechanism 164 from being jammed with articles from the table.

Extending outwardly from and fixed to the portion of the guide member 30 below the cut-out portion 410 is a bracket member 438. Supported on the forward end of bracket member 438 is a vertical shaft 440 having a radially extending latch keeper arm 442 pivotally mounted thereon. The arm 442 is adapted to pivot on the shaft 440 and is normally urged in a counterclockwise direction as viewed in FIGURE 7 by spring means (not shown). A stop member 444 provided on a collar 446 of shaft 440 prevents counterclockwise movement of the arm 442 beyond a predetermined position.

The bracket member 431 is provided with an outwardly extending portion 448 which supports a pivoted latch member 450 that cooperates with the keeper member or arm 442 as disclosed in FIGURE 7. The latch member 450 is normally urged in a counterclockwise direction about its pivot 451 by spring means (not shown) when viewed in FIGURE 7, and a stop element 452 extending upwardly from the portion 448 of bracket 431 is adapted to engage and limit the counterclockwise movement of the latch member 450 to a predetermined position.

An L-shaped article sensing or feeler lever 453 is pivoted to the inwardly extending portion 432 of bracket 431 as indicated at 454. One arm portion 455 of the L-shaped pivot lever 453 is adapted to engage the latch member 450 at 456 while the other arm portion 457 of the pivot lever 453 is provided with an article gripping or engaging surface 458. Pivot lever 453 is provided with a switch engaging element 460, the switch engaging element being adapted to contact and actuate a switch actuating element 464 of a microswitch 462. The microswitch 462 is also carried on the bracket plate 431 as shown in FIGURE 7. A spring 490 connected to the arm 457 of lever 453 and to a bracket 492 adjustably mounted on the plate 431 normally urges the lever in a counterclockwise direction when the lever is not latched.

Extending upwardly from the bracket member 438 is a latch reset pin 466, the pin being adapted to engage the outer end of the arm 455 of lever 453 to cause the same to rotate clockwise and latch with the latch 450 as indicated at 456.

The article-engaging surface 458 of the pivot lever 453 may be adjusted laterally of the arm 457 by means of the slot and bolt arrangement generally indicated at 459 so that the mechanism can be adjusted to sense articles of different diameter. Further, the whole bracket plate 431 which is bolted to the base plate 426 at 470 may be adjusted longitudinally of the base plate so that the sensing mechanism may be utilized when different length articles are used. Note the slots 472 in the bracket plate 431 provides for its longitudinal adjustment relative to the base plate 426.

Figure 14:
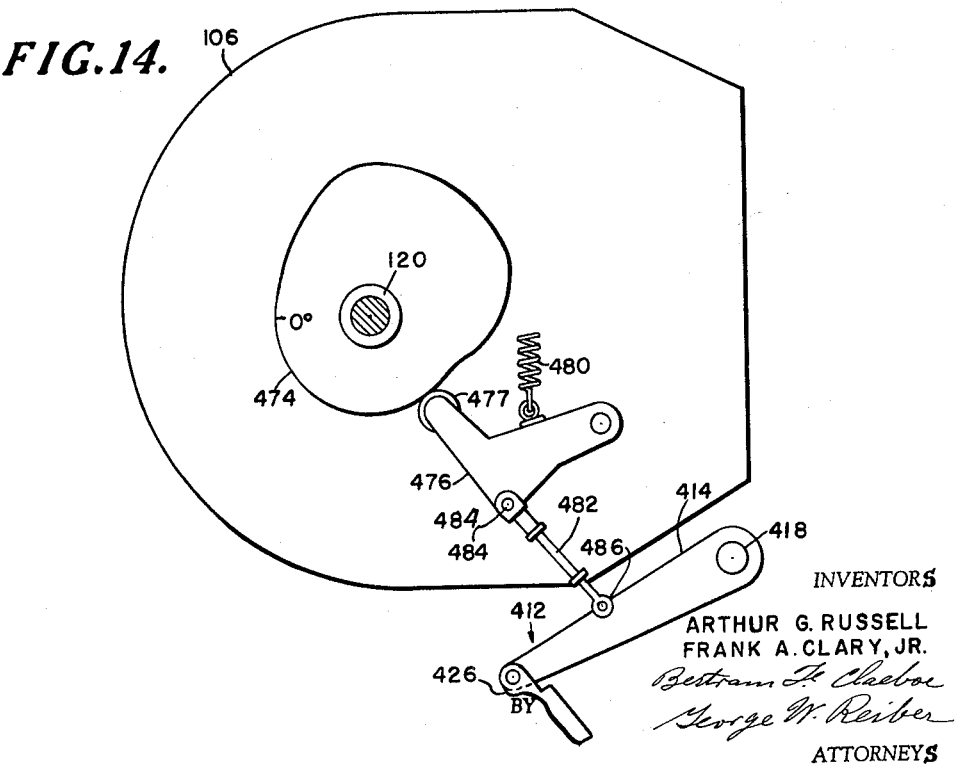
FIGURE 14 is a view similar to FIGURE 11 but showing the sensing mechanism latch cam.

Referring now to FIGURES 4, 14 and 15, a quadrant cam 474 is provided on cam shaft 120 for moving the quadrant assembly 412 back and forth on the pivots 418 and 420. Cooperating with the quadrant cam 474 is a cam follower 476 pivotally mounted on a vertical shaft 478 extending upwardly from the lower clock plate 106. Cam follower 476 has its roller 477 normally urged into engagement with cam 474 by means of a spring 480 attached thereto and attached at a suitable place on the frame structure 10 (not shown). A connecting link 482 is pivotally connected to the cam follower as indicated at 484 and extends therefrom and is pivotally connected to the pivot arm 414 at 486. Movement of the cam will cause the roller 477 of the cam follower 476 to follow the cam's contour and will in turn pivot the pivot arm 414 on its pivot 418. Movement of the pivot arm 414 will cause the quadrant 412 to move back and forth on an arc substantially equal to the radius of guide member 30. The movement of the quadrant 412 member back and forth controls the operation of the sensing lever 453 through the latch 450 and keeper 442 as will be explained in more detail later in the specification.

The operation of the quadrant 412 and the sensing arm 453 is as follows: When the quadrant 412 is at the left as viewed in FIGURE 7, the gate 320 is opened in the manner previously explained, permitting one article to enter the pick-up station 17. The cam shaft 120, which is continuously rotated, rotates cam 474 to a position where the cam follower moves the quadrant 412 toward the right of FIGURE 7 to a position disclosed in FIGURE 9. The initial movement of the quadrant to the right of FIGURE 7 will cause the latch 450 to be rotated about its pivot 451 in a clockwise direction because the latch is engaged by the latch keeper 442. Movement of the latch 450 in a clockwise direction will release the L-shaped sensing lever 453 and the spring 490 will urge the arm in a counterclockwise direction to engage the walls of an article positioned in the pick-up station 17 as shown in FIGURE 9.

If the article enters the pick-up station 17 with its closed end first, the article-engaging surface 458 of sensing lever 453 will not be able to flex the article and, consequently, the switch engaging element 460 will not engage the switch actuating element 464 of microswitch 462. On the other hand, if the open end of the article enters the pick-up station 17, as specifically shown by FIGURE 9, the sensing arm will flex or compress the walls of the tubular article and its switch-engaging element 460 will close the microswitch 462 to indicate that the article has entered the pick-up station pointed in a wrong direction. This signal is transferred to the orienting mechanism of the pick-up arm 160 and when the pick-up arm is transferring the article from the pick-up station 17 to the take-off conveyor 18, the article will be rotated 180° on a vertical axis so as to properly position its closed end with respect to its discharge onto the take-off conveyor 18.

Continued movement of the quadrant toward the right of FIGURE 7 will eventually cause the arm portion 455 of the sensing lever 453 to strike the reset pin 466 on the bracket 438. The reset pin will cause the pick-up arm to pivot in a clockwise direction while the quadrant is still being moved to the right until such time that the lever is again latched by the latch element 450. After the sensing lever 453 has been latched, the quadrant moves backward to the position shown in FIGURE 7 where it is ready to receive another article when the article is released by the gate 320 opening.

The article is picked up from pick-up station 17 when the quadrant 412 has moved completely to the right as shown in FIGURE 8, because at this time the reset pin 466 will have pivoted the sensing arm out of engagement with the walls of the article. The pick-up arm 160, operating in timed relationship with the movement of the quadrant 412, moves over the pick-up station 17 as the quadrant 412 moves to the right and then moves vertically downward so that its article-engaging suction cup is in engagement with the wall of the article when the quadrant is at its extreme right-hand position.

Referring now to FIGURE 15, which discloses the layout of quadrant cam 474 in relation to the other operating cams, it will be noted that the quadrant 412 starts its movement toward the right when the quadrant cam has rotated to 349°. When the quadrant cam rotates to 353°, the latch 450 is actuated to release the arm 455 of sensing lever 453 and the lever rotates counterclockwise so that its arm 457 engages the article in pick-up station 17. The quadrant continues to move toward the right until the quadrant cam 474 has rotated to 37°, and at this point the arm 455 of sensing lever 453 strikes the reset pin 466 to release the sensing lever from engagement with the article as well as to reset or latch the sensing lever for another sequence of operation. When the cam 474 has rotated to 64°, the quadrant 412 is at the far right of FIGURE 7 and remains in this position until the cam has rotated to 136°. Between 136° and 202° of the rotation of cam 474, the quadrant 412 is moving to the left or to the position actually shown in FIGURE 7. The quadrant 412 will stay at its left-hand position during rotation of cam 474 from 202° to 349°, at which time the cycle mentioned above is repeated.

Comparing the layout of quadrant cam 474 with the pick-up arm swing cam 354 and the pick-up arm vertical lift cam 360, it will be noted that the pick-up arm is over the rotating table 14 and down in pick-up position when the quadrant is moved to the far right and the sensing lever 453 has released the article. The vacuum release cam 402 applies the vacuum to the vacuum pick-up arm 160 while the quadrant is at the right and maintains the vacuum as the pick-up arm transfers the article to the take-off conveyor 18. The cam 340 de-energizes the gate solenoid 328 so as to release the gate 322 and permit an article to enter the pick-up station 17 when the quadrant is in its left-hand position shown in FIGURE 7.

Referring now to FIGURE 16, which discloses the wiring diagram for the apparatus, a wire or current conducting line 500 is connected into the circuit formed by the lines 214 and 216 at the terminals 502 and 504 respectively. The normally open article position sensing microswitch 462 is in the line 500, the microswitch being operated, as previously described, by the pivot lever 453 when it is released by latch 450 and engages the open end of an article to compress or flex the same. Also in circuit with the line 500 is a relay 506 including a coil 508 and a core 510 having the switches 512 and 514 mounted thereon. A current conducting line or wire 516 running from the terminal 502 to a terminal 518 in the line 500, between the switch 462 and the relay 506, is provided with a pair of normally open contacts 520 which are adapted to be closed by the switch 512 when the relay 506 is energized. Line 516 between the contacts 520 and the terminal 518 is provided with a normally closed switch 522. A current conducting line or wire 524 extends from a terminal 526 in the line 516 positioned between the terminal 502 and the contacts 520 to the terminal 504. The line 524 is provided with a pair of normally open contacts 528 which are adapted to be closed by the switch 514 when relay 506 is energized. Also in the line 524 between the contacts 528 and the terminal 504 is a solenoid 530. The solenoid 530 is adapted to operate the orienting mechanism 162 carried on the pick-up arm 160, as will be described in detail under the heading "Orientation of an Article on the Pick-Up Arm."

Switch 462 is closed when lever 453 senses that an article has entered the pick-up switch 17 with its open end first. By entering the pick-up station 17 with its open end first, the article can be flexed so that the lever 453 can pivot counterclockwise a sufficient distance to engage and actuate the switch 462. This energizes relay 506 which in turn closes the contacts 520 and 528 by actuation of the switches 512 and 514 respectively. A holding circuit is set up when contacts 520 are closed as the current is conducted through the line 516, the contacts 520 to the line 500, so that when lever 453 is reset, and switch 462 is opened, the relay 506 is still energized. Closing of the contacts 528 energizes the solenoid 530 and permits operation of the article orienting mechanism 162 on the pick-up arm 160. Vertical lift cam 360 is provided with a lobe 532 on its peripheral surface, the lobe being adapted to engage the normally closed switch 522 to open the same and break the holding circuit 516 to thereby de-energize the relay 506 breaking the circuit to the solenoid 530. The lobe 532 is positioned on cam 360 so that it will open switch 522 between 8° and 13° of its rotation. This would occur when the pick-up arm is over the table member 14 and is in a position in which orienting mechanism 162 can be reset prior to the sensing of the next successive article entering pick-up station 17.

*Orientation of an Article on the Pick-Up Arm*

Referring now to FIGURES 3, 4, 6, 8 and 9, the orienting mechanism 162 carried by the pick-up arm 160 is adapted to operate when the sensing mechanism 164 indicates that an article has entered the pick-up station 17 with its open end first. The signal of the sensing mechanism 164 occurs when the switch 462 is closed and the orienting mechanism 162 receives this signal and will orient the article 180° as it is being transferred from table member 14 onto take-off conveyor 18.

In more detail, a pulley or sprocket 534 is mounted on pivot shaft 158 above the pick-up arm 160. The pulley or sprocket 534 has a hub 536 which slips over the top of pivot shaft 158, and provides a bearing between the shaft and the pulley so that the shaft may be rotated with respect to the pulley. The lower edge of the hub 536 of pulley 534 rests on the top of the portion of pick-up arm 160 where it is connected to the shaft 158. A plate member 538 having an elongated center aperture 540 is carried by the hub 536 of pulley member 534. Plate 538 is provided with elongated slots 542 and 544 through which support bolts or studs 546 extend upwardly therethrough and are threaded into suitable apertures provided on the pulley 534. The elongated slots 542 and 544 permit movement of the plate member 538 along a diameter of the pulley a distance equal to the length of the slots 542 and 544. A hook-shaped end portion 548 of plate 538 is provided with a cam surface 550 which normally receives a pin element 552 extending vertically upwardly from the upper surface of pick-up arm 160. A spring 554 connected to the plate 538 at 556 and to the under surface of pulley 534 at 558 normally urges the plate 538 toward the right, as viewed in FIGURE 6. When the plate is at the right, the hook-shaped portion 548 of the plate will be in engagement with the pin 552 and horizontal pivotal movement of the pick-up arm 160 by the shaft 158 will cause the pulley 534 to be rotated with it. Stated another way, when in this position, the pick-up arm 160 and the pulley 534 move as a single unit just as if the pulley were fixed to the pivot shaft 158.

An end portion 560 of plate 538 which is positioned opposite the end portion 548 extends outwardly of the pulley 534 and is provided with a latch receiving notch 562. Solenoid 530 is fixedly mounted on a bracket 564 extending upwardly from the upper clock plate 194. Solenoid 530 is of the type having an arm 566 depending vertically downwardly therefrom, the arm being rotated when the solenoid is energized. A latch member or arm 568 is attached to the arm 566 of solenoid 530 and is adapted to be rotated by the solenoid to a position where it engages the notch 562 on the end portion 560 of plate member 538. FIGURE 6 discloses the position of the latch member 568 when the solenoid 530 is de-energized. In this position, the latch member cannot engage the notch 562 on plate 538 and when the pick-up arm 160 swings to and from its position over the pick-up station 17 it will carry with it the pulley 534. On the other hand, FIGURE 3 discloses the pick-up arm 160 over the pick-up station 17 and also discloses the position of latch member 568 when the solenoid 530 is energized. In this position the latch member 568 prevents the pulley 534 from rotating with the pick-up arm 160 when it is pivoted. It will be noted in FIGURES 8 and 9 the latch member 568 is of substantial vertical thickness, the thickness permitting vertical movement of the pick-up arm 160 and the pulley 534 from the lowermost position to the uppermost position. When the latch member 568 engages the notch 562 of plate 538 as shown in FIGURE 3, the movement of the pick-up arm 160 upwardly from the pick-up station will not affect the relative latching of the plate member 538 with the latch 568. Movement of the pick-up arm 160 in its horizontal swing from over the pick-up station 17 to a position over take-off conveyor 18 begins, but since the latch member 568 is in the relatively deep slot 562, it will prevent the plate member 538 from turning with the pick-up arm. Since the plate member 538 is fixed for rotation with the pulley 534, the pulley also will not rotate and consequently the pick-up arm will make its swing without rotation of the pulley 534. It will be noted that during the first portion of the swing of pick-up arm 160, its pin member 552 will cam the plate member 538 to the left of FIGURE 6 so that the plate member is released from the pin. As soon as the plate member 538 is free of the pin 552, the plate member will move back to the right, as viewed in FIGURE 6, because of the spring 554.

Referring now to FIGURE 4, the article engaging pick-up vacuum cup 388 is mounted in fitting 386 on a vertical shaft 570. The shaft 570 can rotate with respect to the pick-up arm 160 so as to rotate the cup 388 about a vertical axis. A pulley or sprocket 572 is mounted on the upper end of shaft 570 for rotation therewith. Although details of the shaft 570 and its connection to the fitting 386 are not shown, it is to be understood that the shaft is tubular and that the fitting and shaft are provided with a suitable coupling arrangement whereby vacuum can be applied to the suction cup 388 even though the cup may be rotated 180° on its vertical axis.

Each of the pulleys 574 and 534 are provided with gear teeth for receiving a chain element 574 which is carried around the pulley 572 and the pulley 534, as well as an idler sprocket 576 mounted on the pick-up arm 160. The ends 578 and 580 of chain 574 are connected by means of a tension spring 582.

As is now evident, when the pick-up arm 160 swings on its vertical axis, it will carry with it the pulley 534 unless the latch 568 is engaging the notch on the plate member 538. Such movement will cause no rotation of the cup 388, as both pulleys 534 and 572 are stationary with respect to each other and there is no movement of the chain element 574. However, when the latch 568 engages the notch 562 of plate 538 and the pick-up arm 160 is over the pick-up station 17, pulley 534 will not move when the pick-up arm makes its horizontal swing toward the take-off conveyor 18. Since the pulley 534 is maintained stationary, as the pick-up arm 160 pivots, the effective distance between the points A and B on FIGURE 3 will be decreased and the spring 582 will take up the chain 574 so as to rotate the pulley 572 in a counterclockwise direction 180°. This in turn rotates the cup member 388 and properly positions an article with respect to its discharge onto the take-off conveyor 18.

As previously mentioned, the solenoid 530 will receive its signal that an article has improperly entered the pick-up station 17 when the latch 450 releases the feeler lever 453 and it engages the article. If the lever 453 can compress or flex the article, it will close the switch 462 and, as previously described, the solenoid 530 is energized to cause the latch 568 to engage and latch the plate 562, thus, preventing the pulley 534 from rotating with the pivoting of pick-up arm 160. The article which has improperly entered the pick-up station 17 will then be picked up and oriented as the pick-up arm 160 moves out toward the takeoff conveyor 18. Movement of the arm back from over the take-off conveyor 18 to a position over the pick-up station 17 will rotate the empty cup 388 clockwise 180° back to its original position. As the pick-up arm 160 approaches the pick-up station, its pin element will strike the plate 538 and will cam the same to the left as viewed in FIGURE 6 until the pin is received in the notch 550. The plate 538 then moves to the right but the latch is still engaging its slot 562. Since the holding circuit 516 is still energizing the solenoid 530, the lobe 532 on cam 360 opens the switch 522 to de-energize solenoid 530 and release the latch 568 from the plate member 534. If the next article received in the pick-up station 17 enters the station in the right position, switch 462 will not close and, consequently, the pin member 552 on the pick-up arm 160 will cause the pulley 534 to turn as a unit with the pick-up arm and, thus, the pick-up suction cup 388 will not be rotated. On the other hand, if the next successive article enters the pick-up station 17 in the wrong direction, the signal is given by the feeler lever 453 closing the switch 462 and the solenoid 530 is energized and the above sequence of operation is repeated with the article being picked up and oriented 180° in its transfer to the take-off conveyor 18.

The terminology used in the specification and claims is for the purpose of description and not limitation, the scope of the invention being defined in the claims.

We claim:
1. A mechanism for handling and arranging articles comprising a rotary unscrambling table, a hopper having a bottom opening for discharge of articles upon the surface of said unscrambling table, said opening being substantially centered above said table, outwardly displaceable wall portions depending from the hopper margins surrounding said opening and normally forming a downward tubular extension of said hopper, a dispensing control table mounted for rotation about a substantially vertical axis centered approximately beneath said hopper opening and at a level normally to retain articles within said hopper and said tubular extension, means to move said control table about its axis with sufficient velocity to cause the articles thereon to displace said depending wall portions so as to be discharged by sliding from said control table surface outwardly from said axis in random directions, means for sensing the article loaded condition of said unscrambling table, and means for activating said control table moving means in response to sensing of a condition of insufficient loading of said unscrambling table, and for stopping said control table moving means in response to sensing of a condition of adequate loading of said unscrambling table.

2. A mechanism as set forth in claim 1 in which the rotary motion of the control table about its axis is oscillatory.

3. A mechanism according to claim 2 in which at least portions of the hopper walls are flexible, and which further includes means for agitating the hopper walls at the same time that the control table is moved.

4. A mechanism according to claim 1 in which at least portions of the hopper walls are flexible, and which further includes means for agitating the hopper walls at the same time that the control table is moved.

5. A mechanism for handling and arranging relatively light weight tubular articles, comprising a hopper having a bottom opening for discharge of articles, said hopper having outwardly displaceable flexible wall portions depending from the hopper margins surrounding said opening and normally forming a downward tubular extension of said hopper, a dispensing control table having a diameter substantially corresponding to the diameter of said opening mounted for rotation about a substantially vertical axis centered below said hopper opening and at a level normally to retain articles within said hopper and said tubular extension, means to move said table about its axis with sufficient velocity to cause the articles thereon to displace said flexible wall portions and to escape from said table outwardly in random directions, and means for agitating said hopper wall portions simultaneously with the moving of said table.

References Cited in the file of this patent
UNITED STATES PATENTS

| | | |
|---|---|---|
| 367,599 | Conant | Aug. 2, 1887 |
| 494,979 | Dawson | Apr. 4, 1893 |
| 689,540 | Colomy | Dec. 24, 1901 |
| 758,159 | Way | Apr. 26, 1904 |
| 910,097 | Topp | Jan. 19, 1909 |
| 1,662,883 | Cole | Mar. 20, 1928 |
| 2,616,758 | Meyers | Nov. 4, 1952 |
| 2,692,702 | Church | Oct. 26, 1954 |
| 2,761,543 | Brenneck et al. | Sept. 4, 1956 |
| 2,985,338 | Everett | May 23, 1961 |